United States Patent [19]

Avitzur

[11] E Re. 28,511

[45] Reissued Aug. 12, 1975

[54] SHAPING OF HOLLOW WORKPIECES

[76] Inventor: Betzalel Avitzur, 817 31st St., Allentown, Pa. 18104

[22] Filed: Aug. 8, 1974

[21] Appl. No.: 495,853

Related U.S. Patent Documents

Reissue of:

[64] Patent No.: 3,685,337
Issued: Aug. 22, 1972
Appl. No.: 889,218
Filed: Dec. 30, 1969

[52] U.S. Cl. ..... 72/347
[51] Int. Cl.[2] ..... B21D 22/20
[58] Field of Search ..... 72/41, 43, 45, 347, 348, 72/349, 253, 370, 467, 468; 29/1.2, 1.21, 1.3

[56] References Cited

UNITED STATES PATENTS

| | | | |
|---|---|---|---|
| 211,342 | 1/1879 | Palmer | 72/347 |
| 2,821,156 | 1/1958 | Lyon | 72/348 |
| 3,359,775 | 12/1967 | Langewis | 72/349 |
| 3,360,157 | 12/1967 | Bolt et al. | 113/120 A |
| 3,459,021 | 8/1969 | Fuchs, Jr. | 72/347 |
| R23,095 | 3/1949 | Keller | 72/349 |

FOREIGN PATENTS OR APPLICATIONS

| | | | |
|---|---|---|---|
| 625,011 | 6/1949 | United Kingdom | 72/349 |
| 807,085 | 6/1951 | Germany | 72/60 |
| 834,626 | 5/1960 | United Kingdom | 72/60 |
| 1,468,073 | 12/1966 | France | 72/60 |

OTHER PUBLICATIONS

"Promotion of Fluid Lubrication in Wire Drawing" by Christopherson et al., pp. 643–653; Proc. Inst. Mech. Eng.; 169; 1955.

*Primary Examiner*—Richard J. Herbst
*Attorney, Agent, or Firm*—Eric Michelson

[57] ABSTRACT

A hollow workpiece to be ironed is subjected to a relatively large frictional force at its interior engaged by a punch, and to a smaller frictional force at its outside engaged by a die, whereby tensile stresses in the ironed portion of the workpiece are decreased and larger reductions in wall thickness are rendered possible per die. Deep drawing may be combined with ironing and both performed during a single stroke of the punch.

18 Claims, 26 Drawing Figures

INVENTOR.
BETZALEL AVITZUR

BY

E. Michelson

INVENTOR.
BETZALEL AVITZUR

BY

S. Michelson

INVENTOR.
BETZALEL AVITZUR

BY

S. Michelson

INVENTOR.
BETZALEL AVITZUR

BY

Michelson

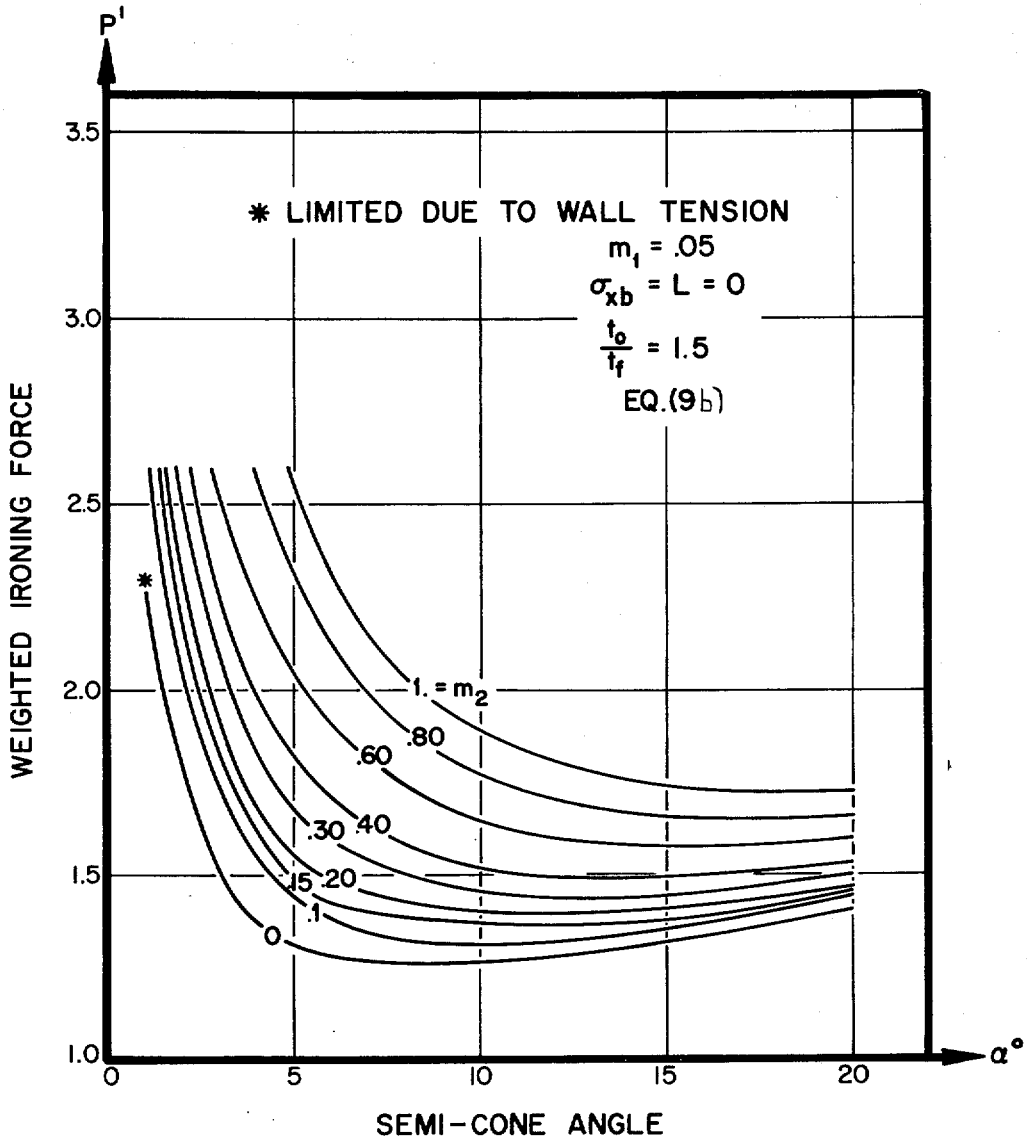
FIG. 3a WEIGHTED IRONING FORCE AS A FUNCTION OF $\alpha$ AND $m_2$.
BETZALEL AVITZUR
INVENTOR.
BY E. Michelson

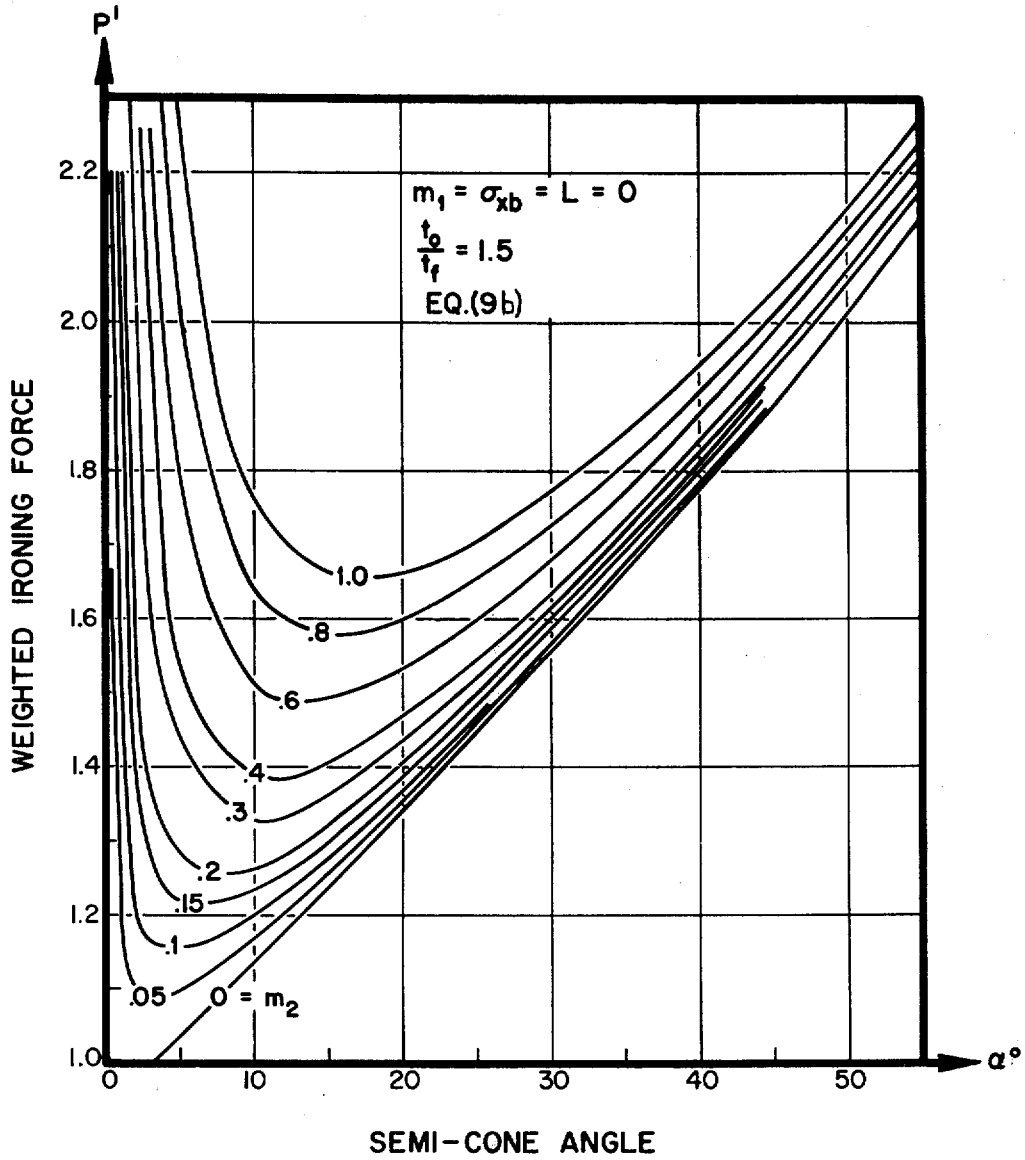
FIG. 3b WEIGHTED IRONING FORCE AS A FUNCTION OF α AND $m_2$.
BETZALEL AVITZUR
*INVENTOR.*
BY

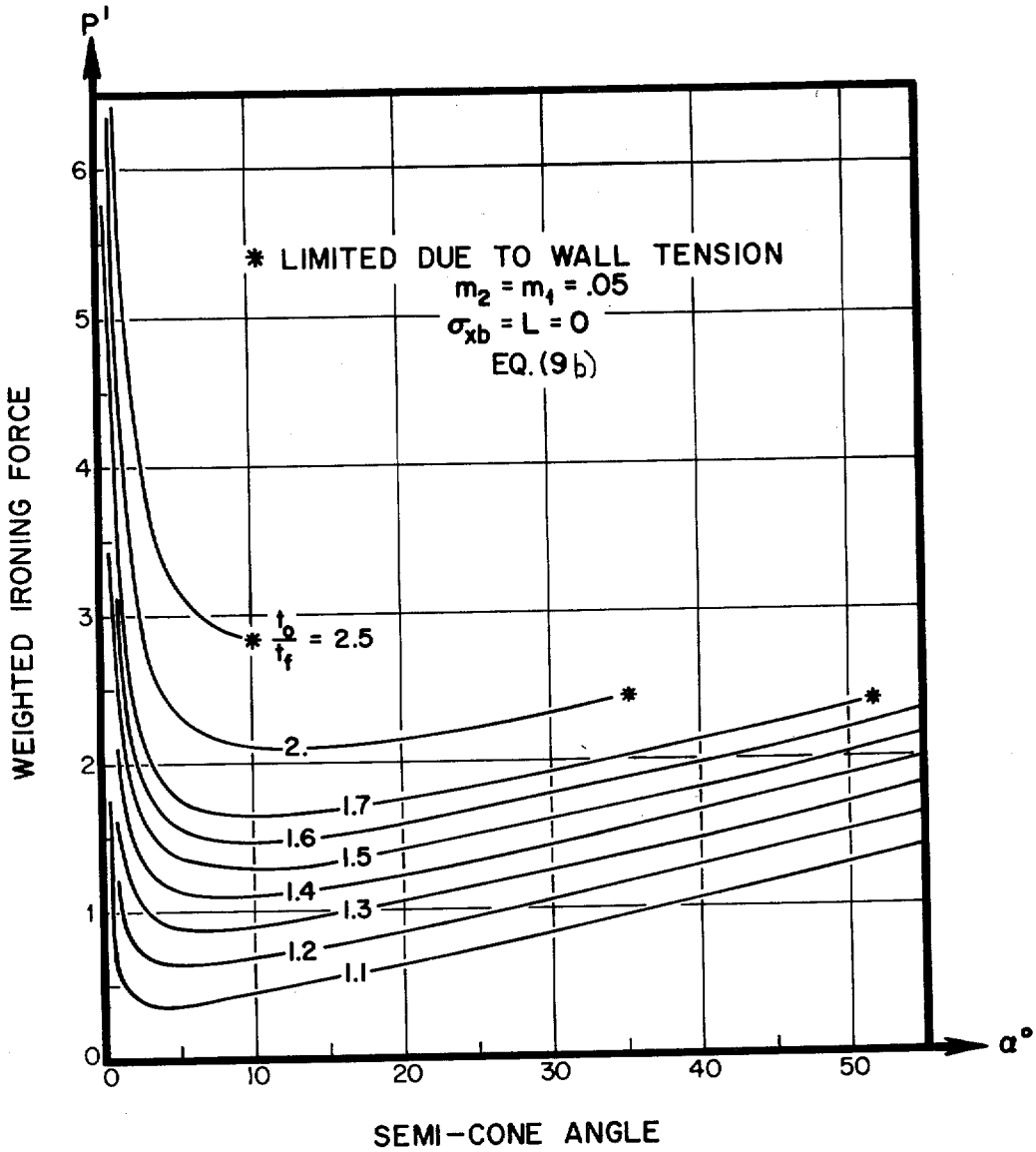
FIG.4a WEIGHTED IRONING FORCE AS A FUNCTION OF $\alpha$ AND $t_o/t_f$.
BETZALEL AVITZUR
*INVENTOR.*
BY

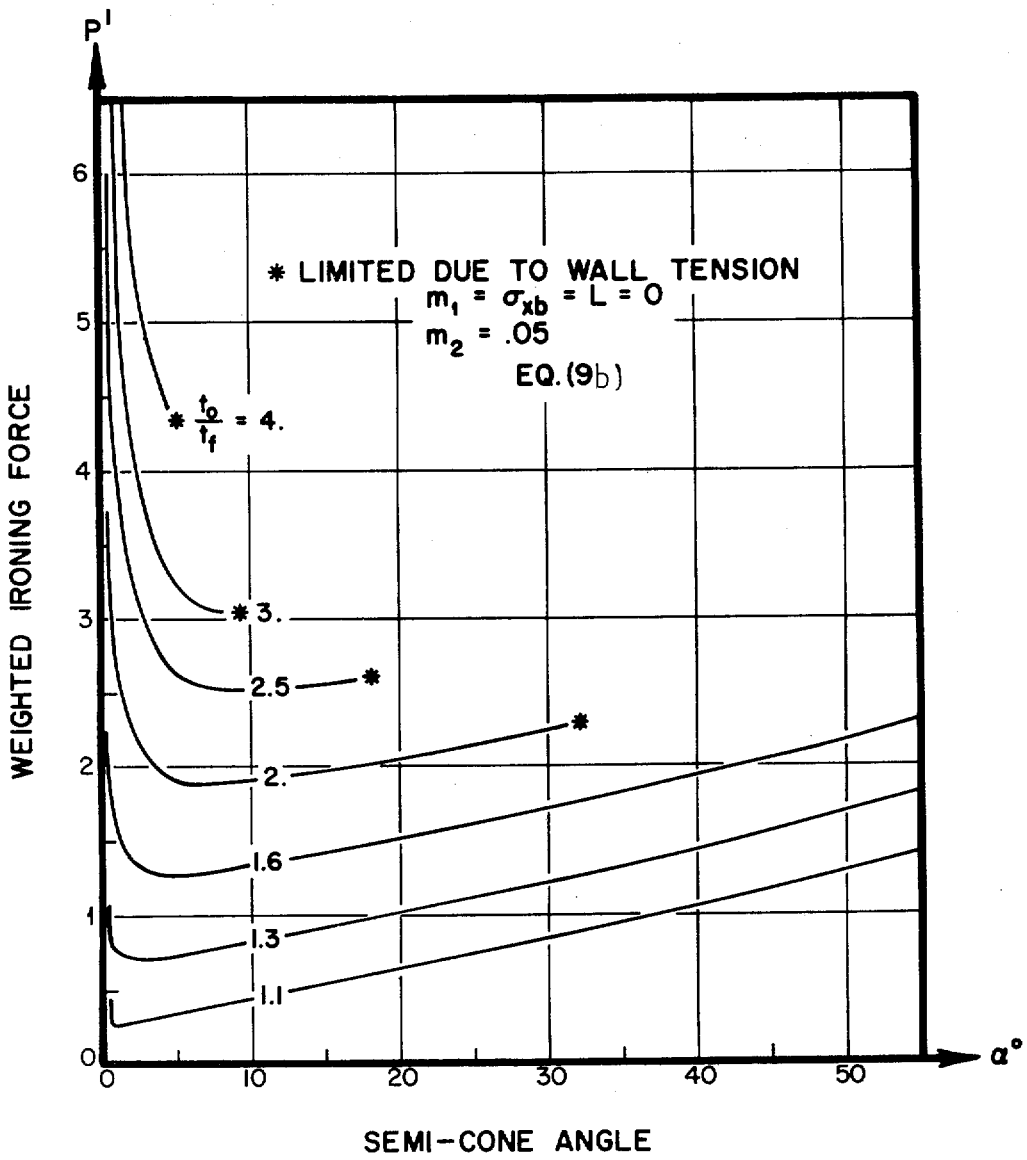
FIG. 4b WEIGHTED IRONING FORCE AS A FUNCTION OF $\alpha$ AND $t_o/t_f$.
BETZALEL AVITZUR
*INVENTOR.*
BY

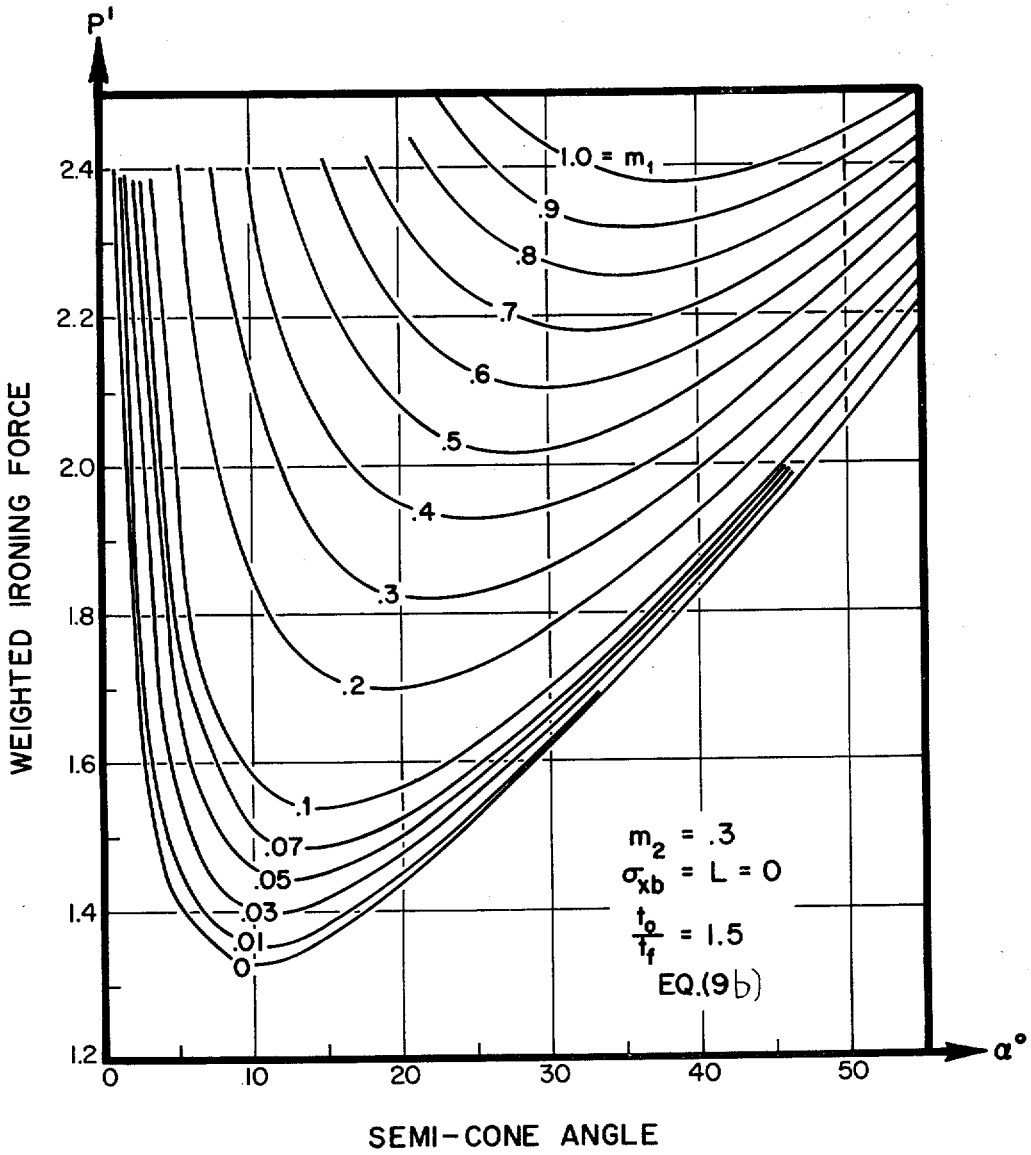
FIG. 5 WEIGHTED IRONING FORCE AS A FUNCTION OF $\alpha$ AND $m_1$.
BETZALEL AVITZUR
*INVENTOR.*
BY

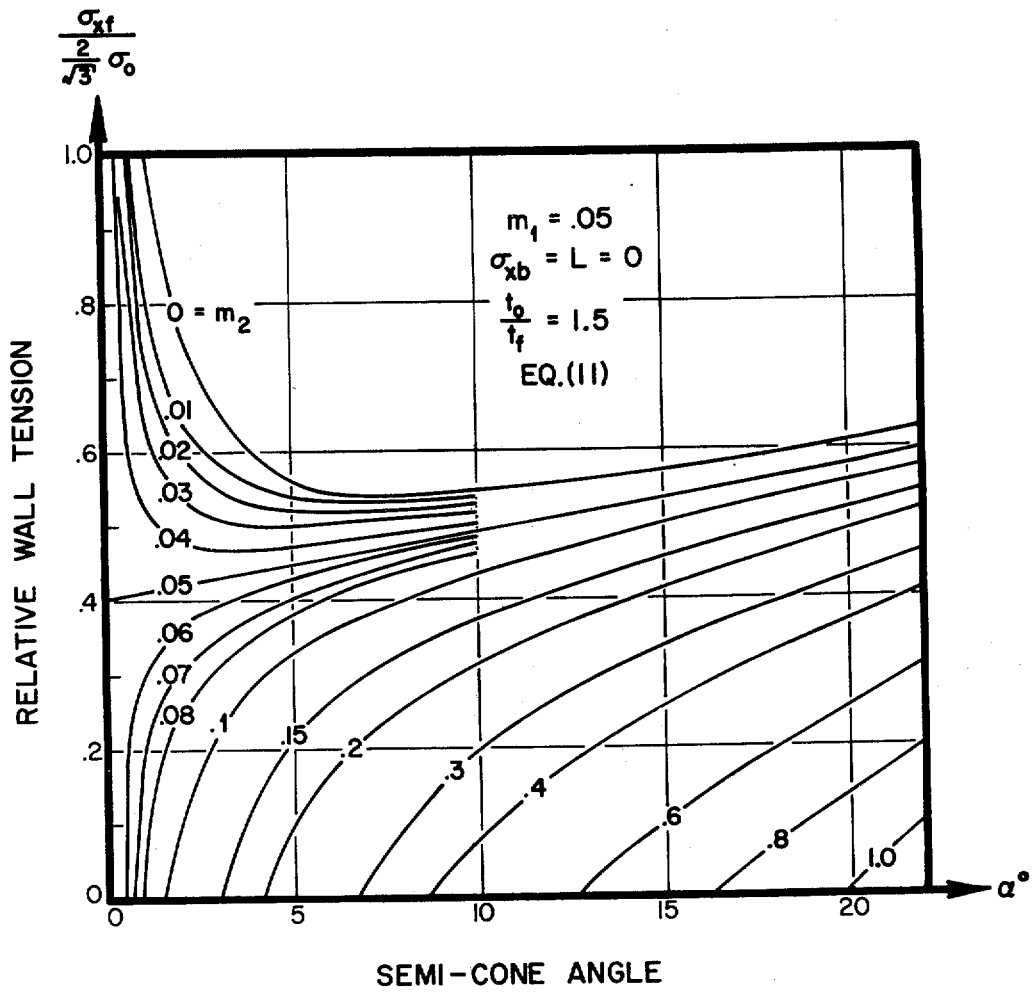
FIG.6a RELATIVE WALL TENSION AS A FUNCTION OF $\alpha$ AND $m_2$.
BETZALEL AVITZUR
*INVENTOR.*
BY

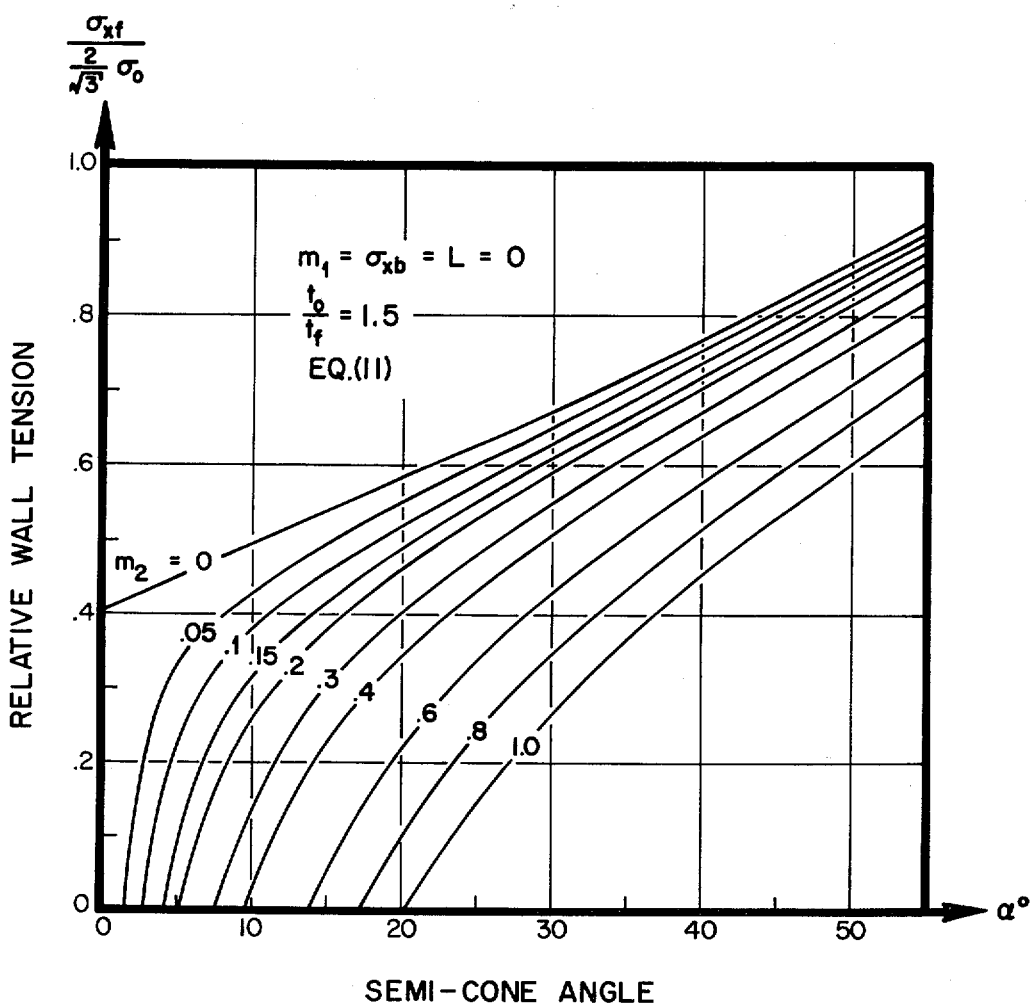
FIG. 6b RELATIVE WALL TENSION AS A FUNCTION OF α AND $m_2$.
BETZALEL AVITZUR
INVENTOR.
BY

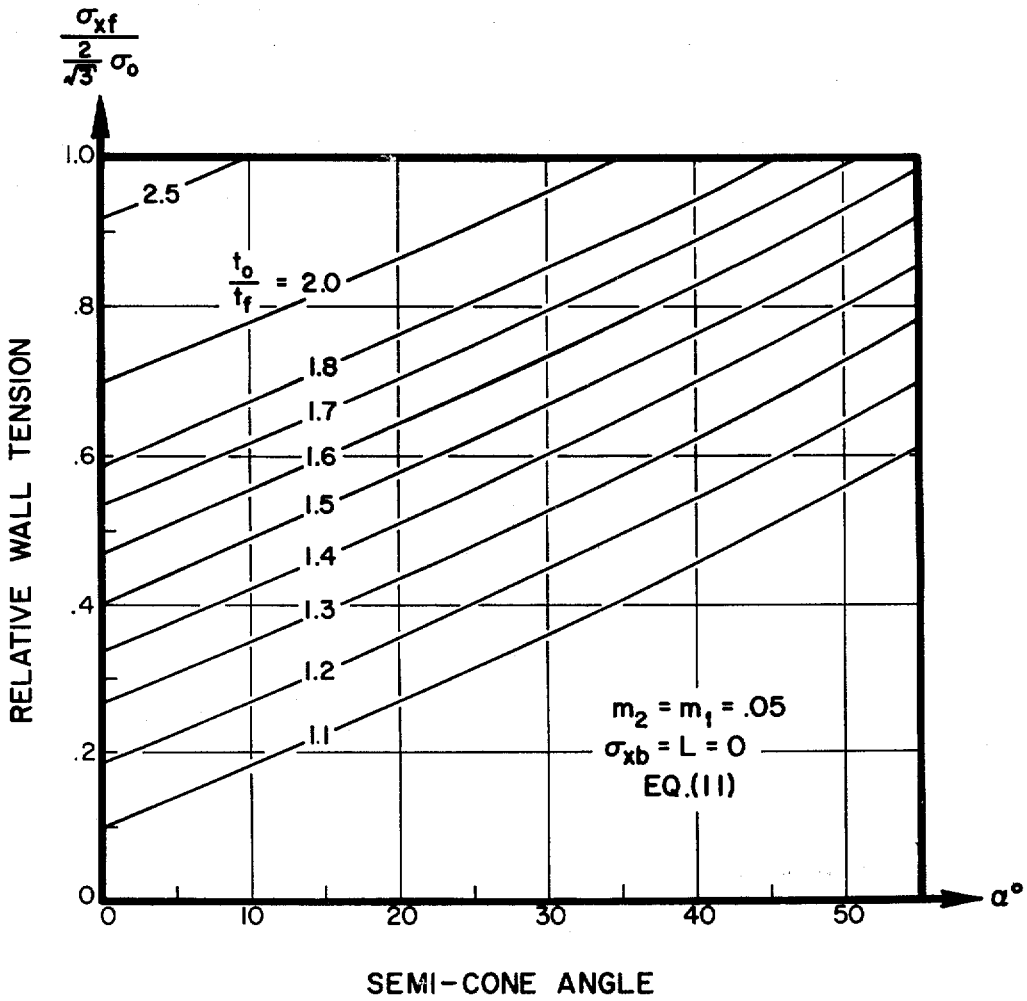
FIG.7a RELATIVE WALL TENSION AS A FUNCTION OF $\alpha$ AND $t_o/t_f$.
BETZALEL AVITZUR
*INVENTOR.*
BY

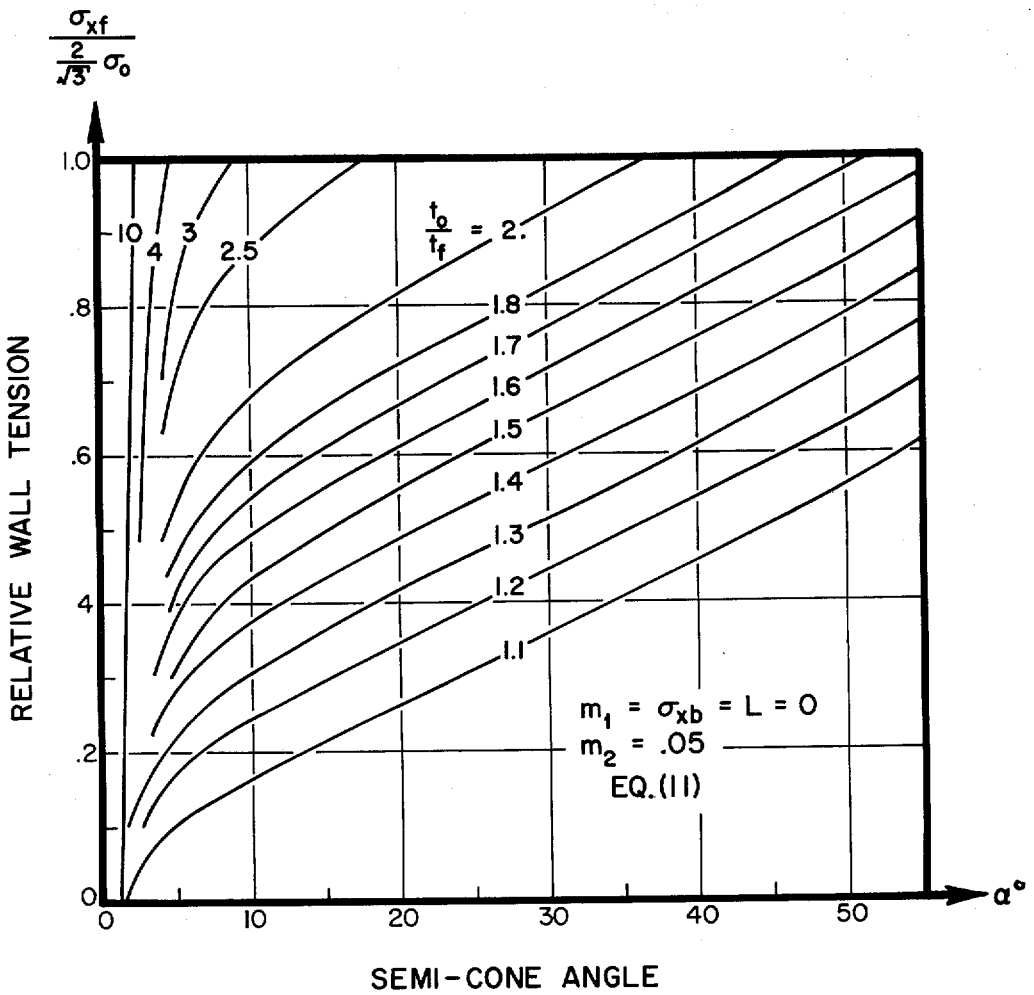
FIG. 7b RELATIVE WALL TENSION AS A FUNCTION OF α AND $t_o/t_f$.
BETZALEL AVITZUR
INVENTOR.
BY

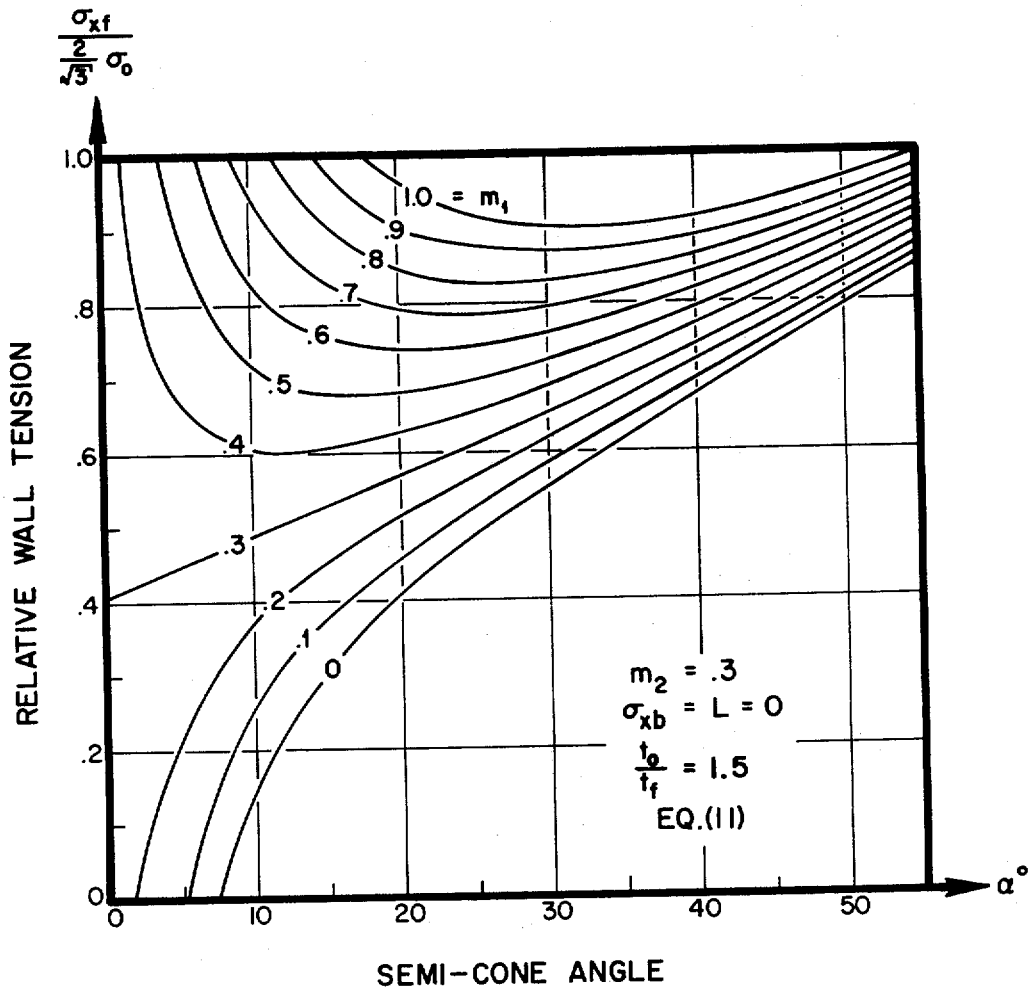
FIG. 8 RELATIVE WALL TENSION AS A FUNCTION OF α AND $m_1$.
BETZALEL AVITZUR
*INVENTOR.*
BY

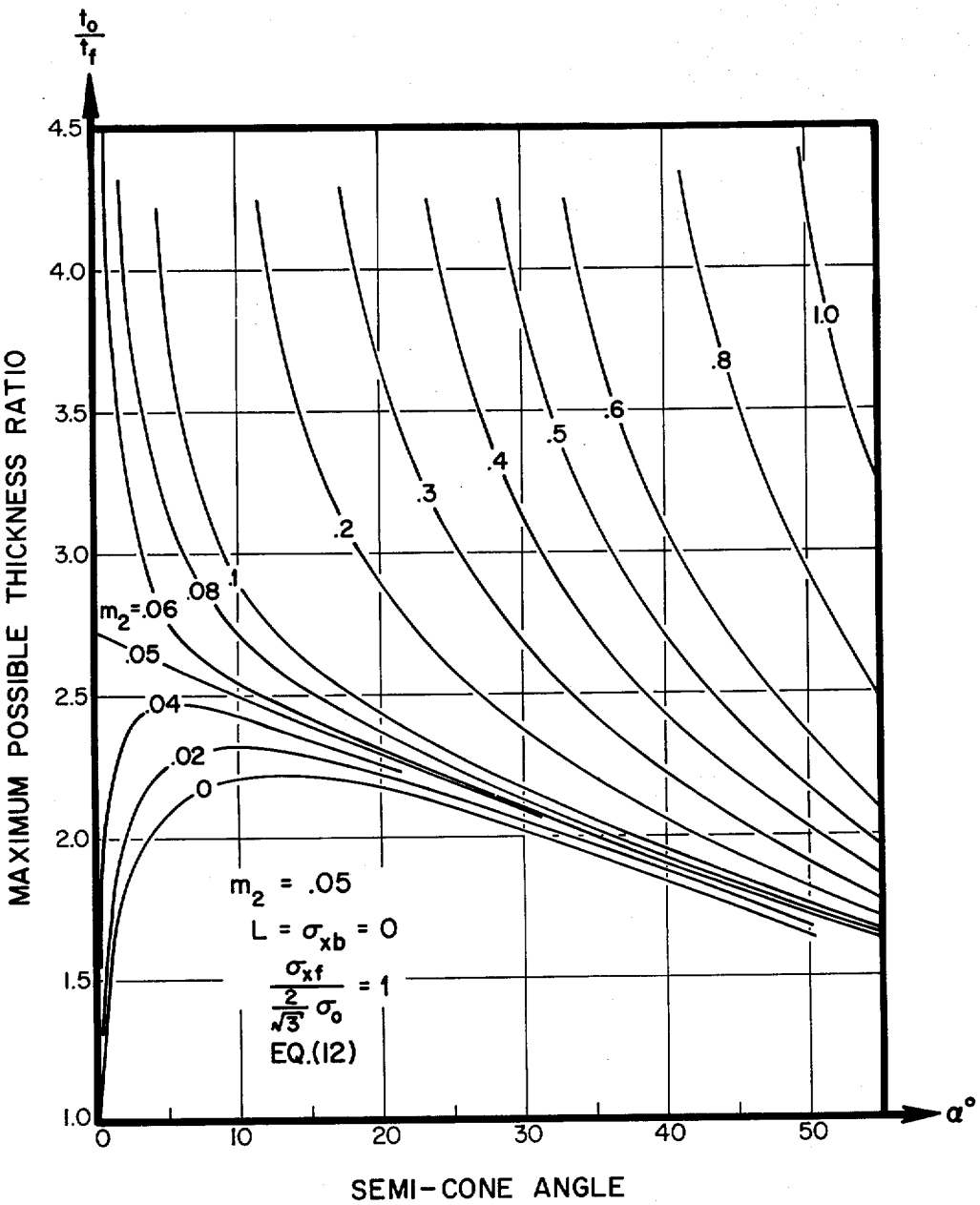
FIG. 9 MAXIMUM POSSIBLE THICKNESS RATIO AS A FUNCTION OF α AND $m_2$.
BETZALEL AVITZUR
*INVENTOR.*
BY E. Michelson

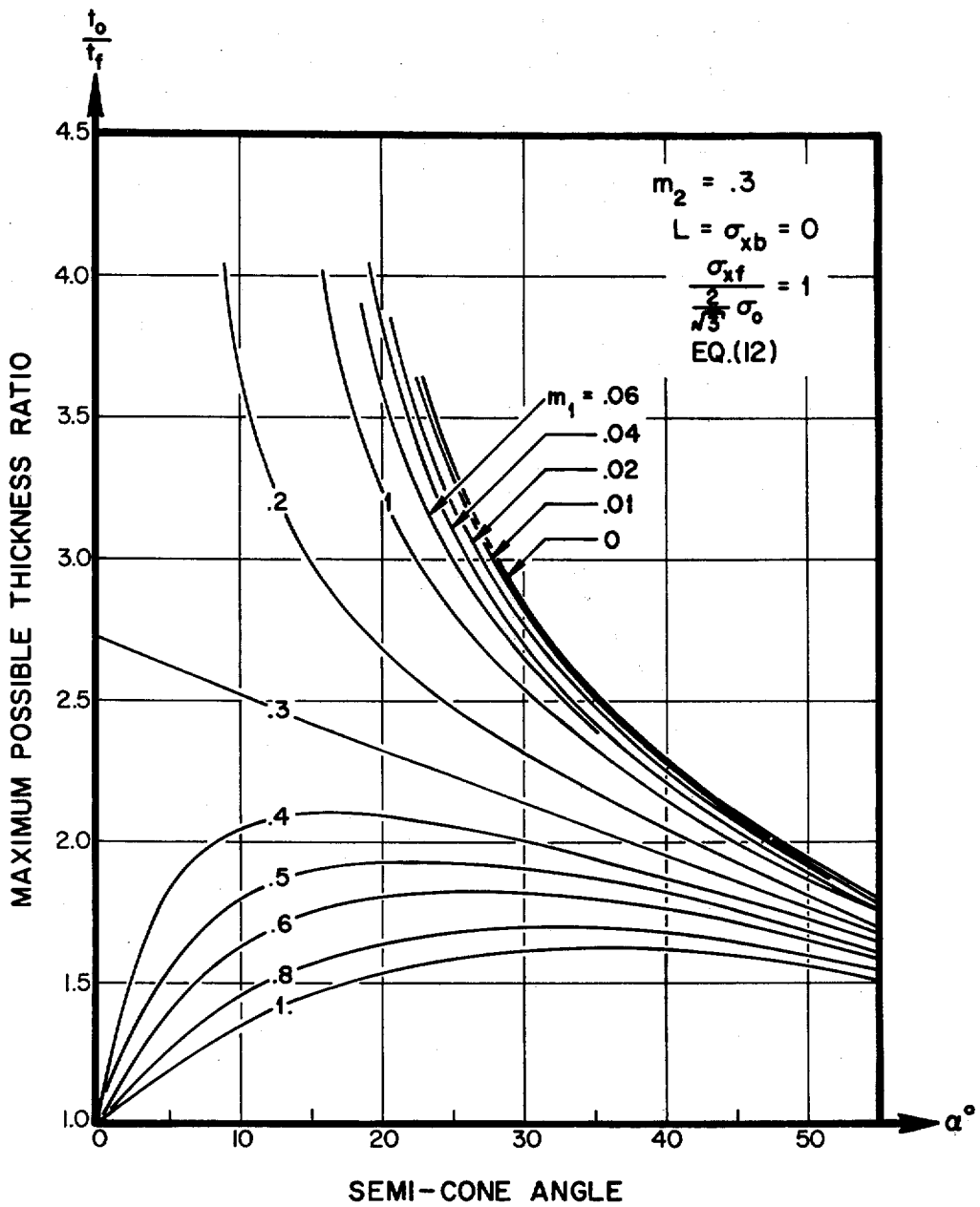
FIG.10 MAXIMUM POSSIBLE THICKNESS RATIO AS A FUNCTION OF α AND $m_1$.
BETZALEL AVITZUR
INVENTOR.
BY

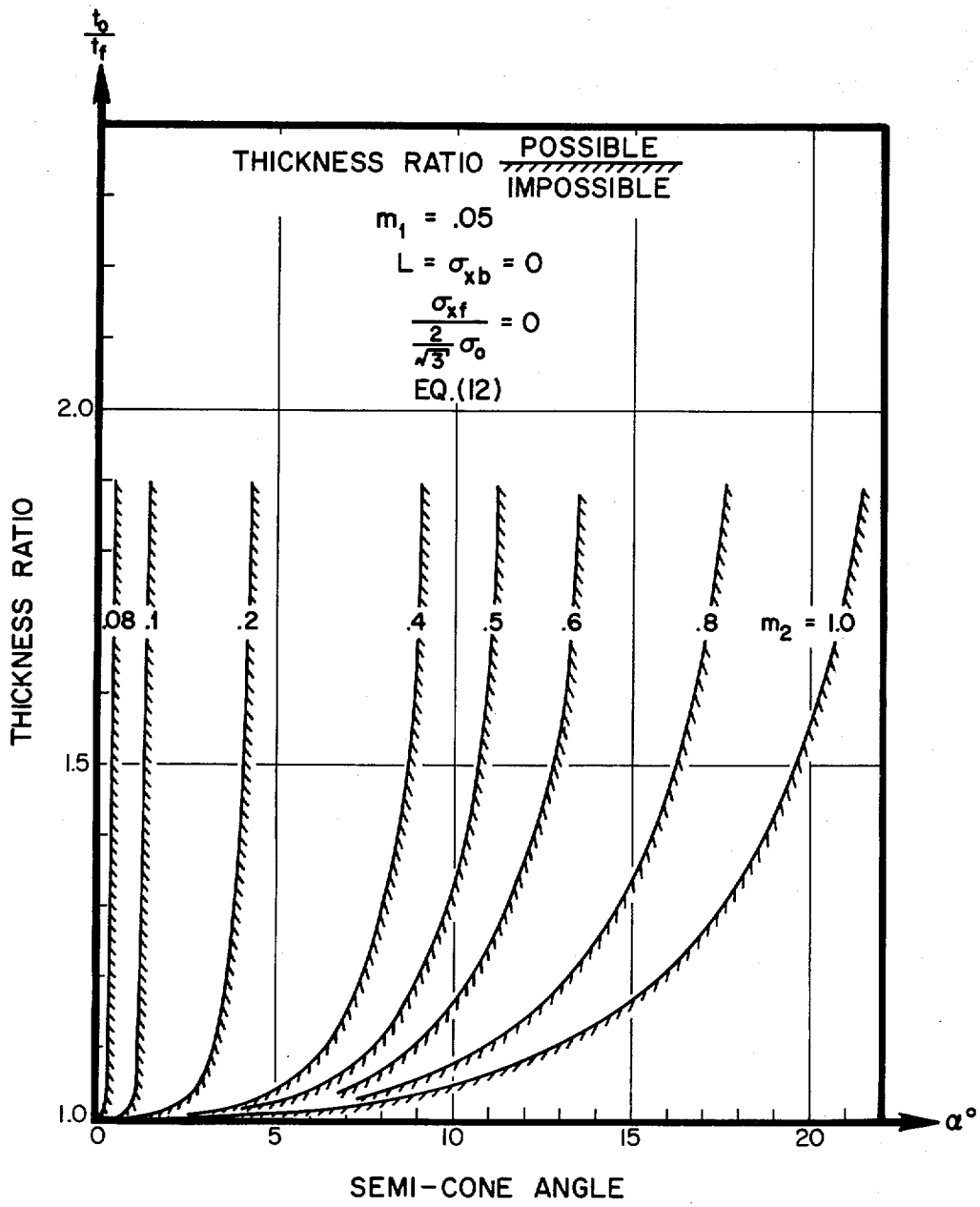
FIG. 11 THICKNESS RATIO AS A FUNCTION OF α AND $m_2$.
BETZALEL AVITZUR
INVENTOR.
BY

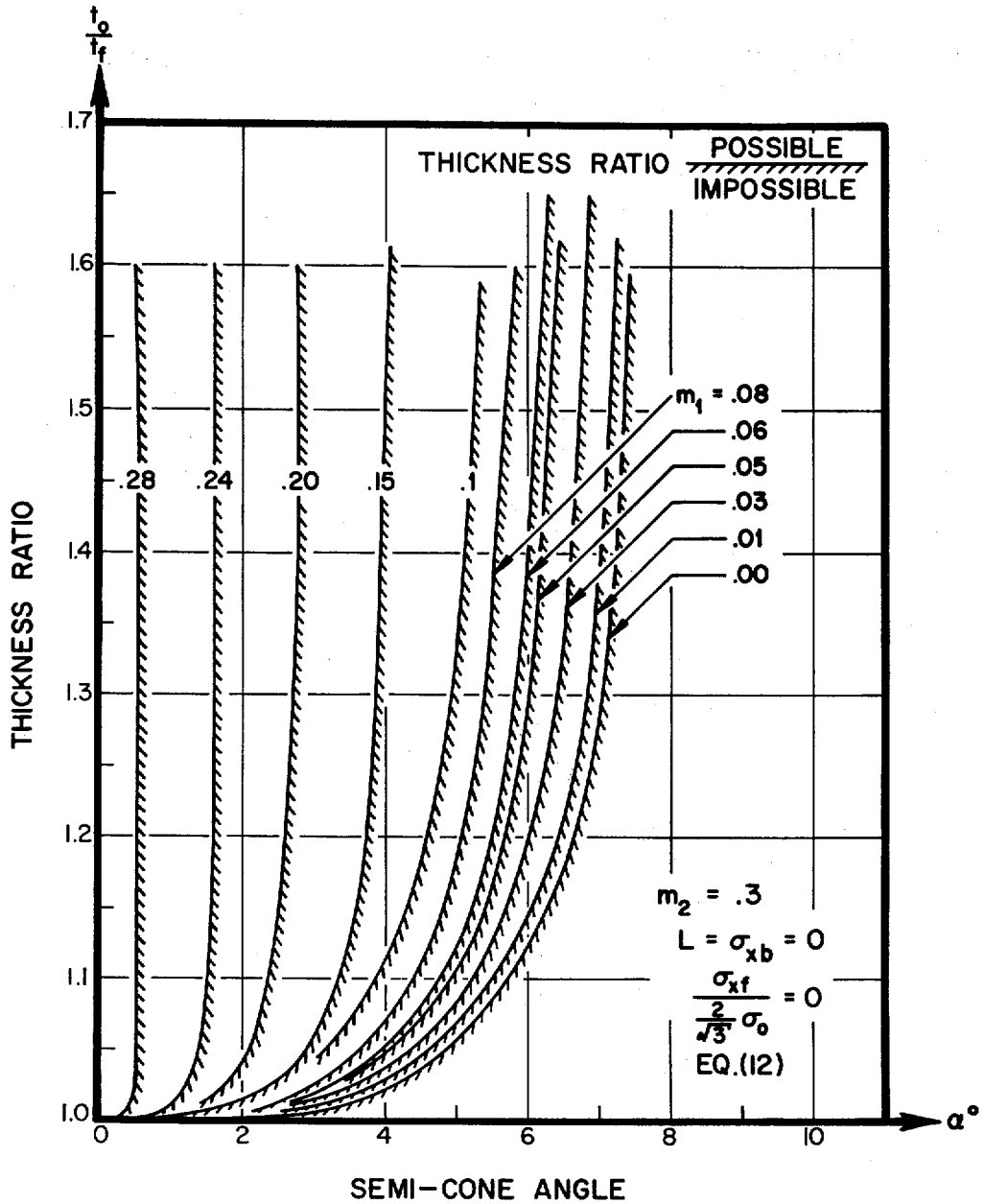
FIG. 12 THICKNESS RATIO AS A FUNCTION OF α AND $m_1$.
BETZALEL AVITZUR
*INVENTOR.*
BY

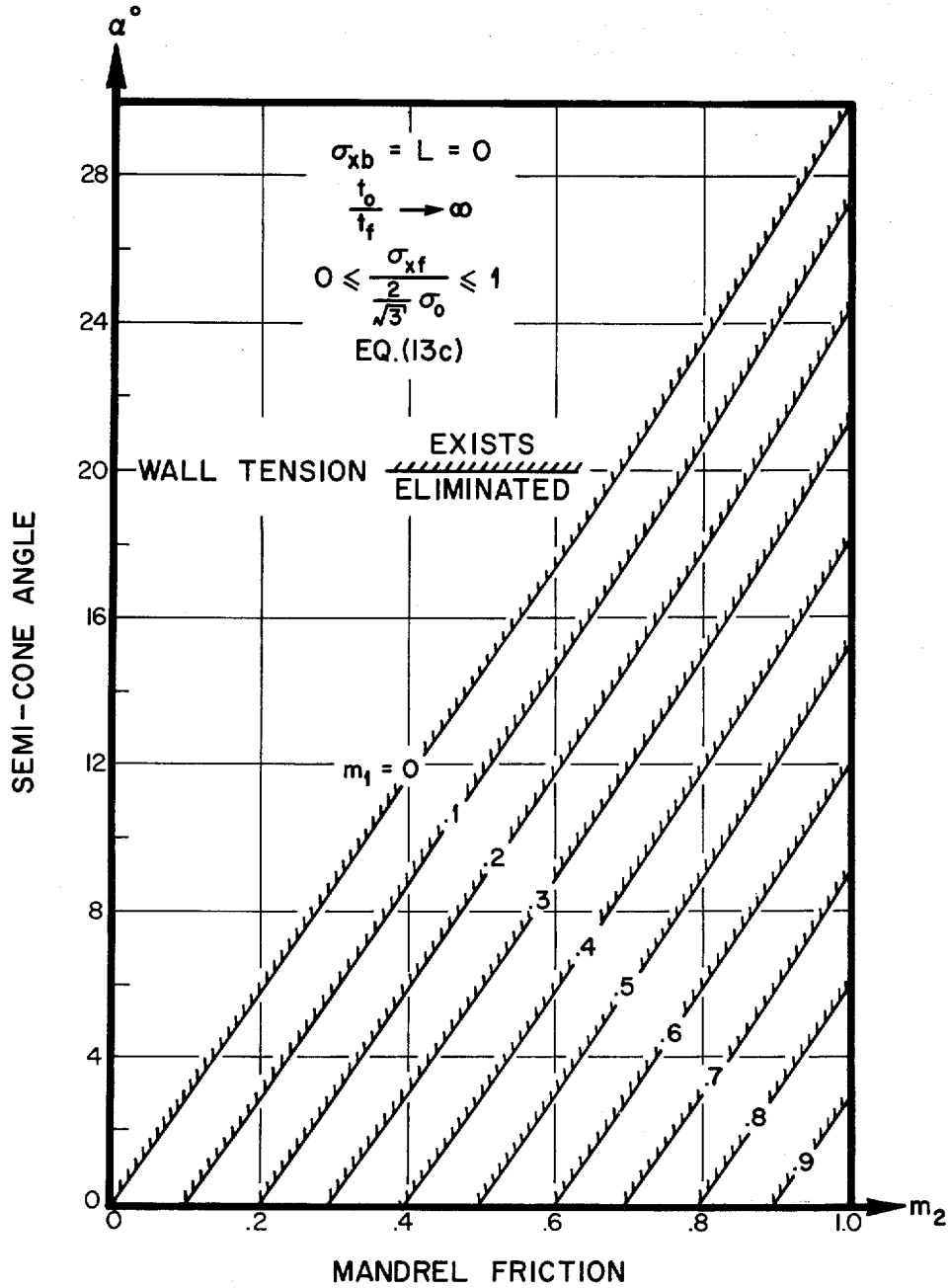
FIG.13 CRITICAL SEMI-CONE ANGLE OF THE DIE TO PREVENT WALL TENSION.
BETZALEL AVITZUR
*INVENTOR.*
BY

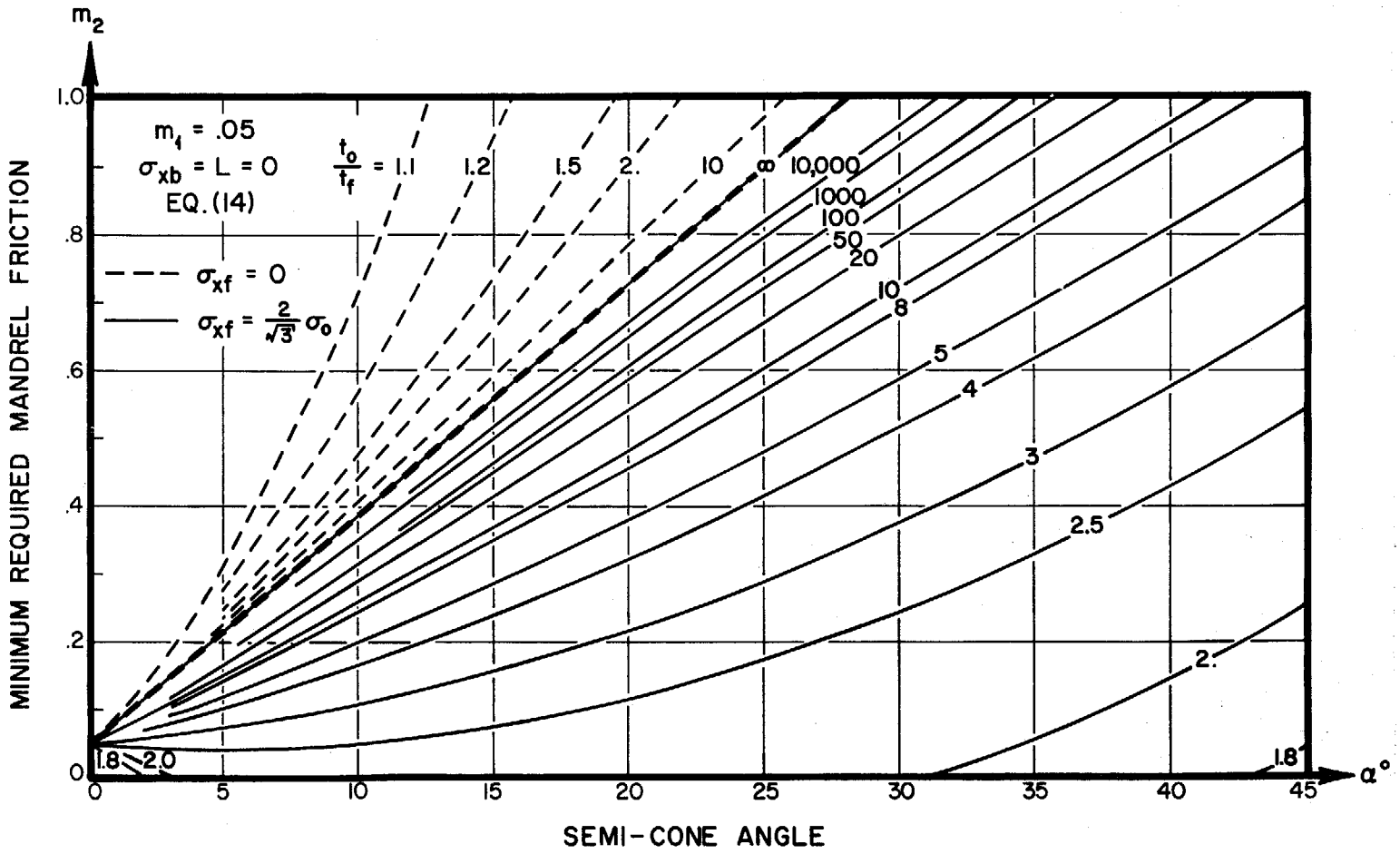
FIG. 14 MINIMUM REQUIRED MANDREL FRICTION AS A FUNCTION OF $\alpha$ AND $t_o/t_f$.
INVENTOR.
BETZALEL AVITZUR
BY

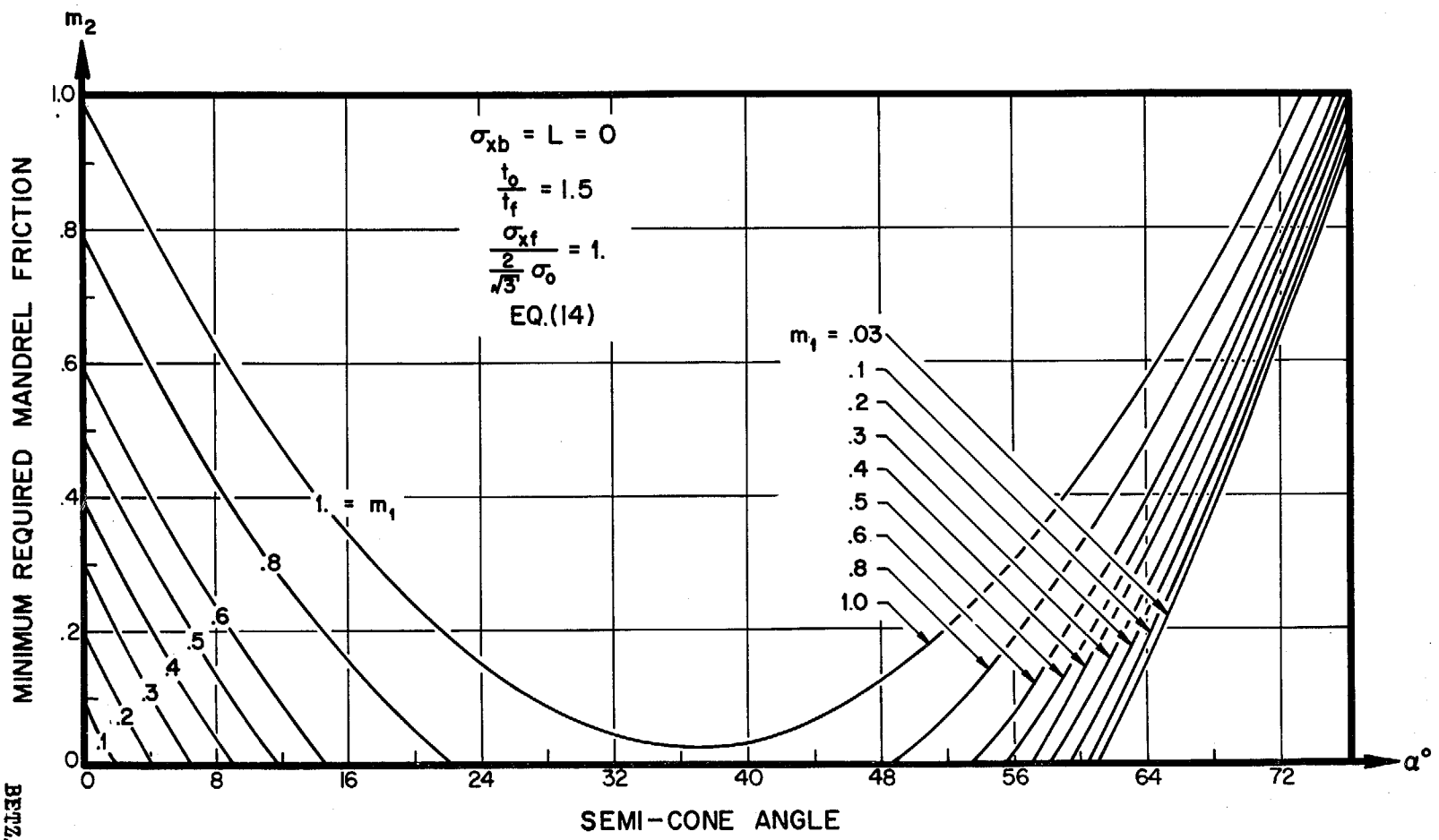
FIG.15a MINIMUM REQUIRED MANDREL FRICTION AS A FUNCTION OF $\alpha$ AND $m_1$.
BETZALEL AVITZUR
INVENTOR.
BY
E. Nicholson

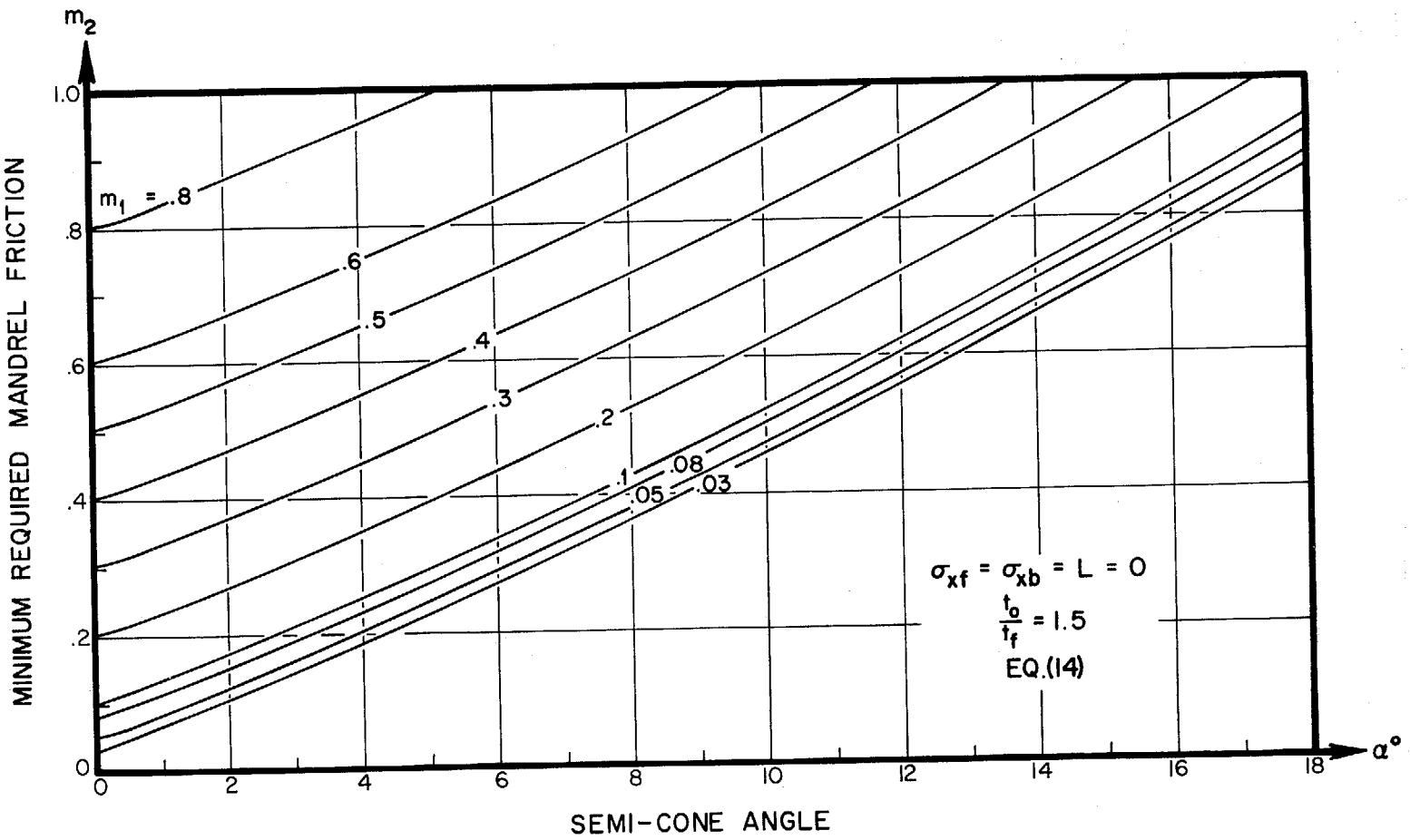
FIG. 15b MINIMUM REQUIRED MANDREL FRICTION AS A FUNCTION OF $\alpha$ AND $m_1$.
INVENTOR.
BETZALEL AVITZUR
BY

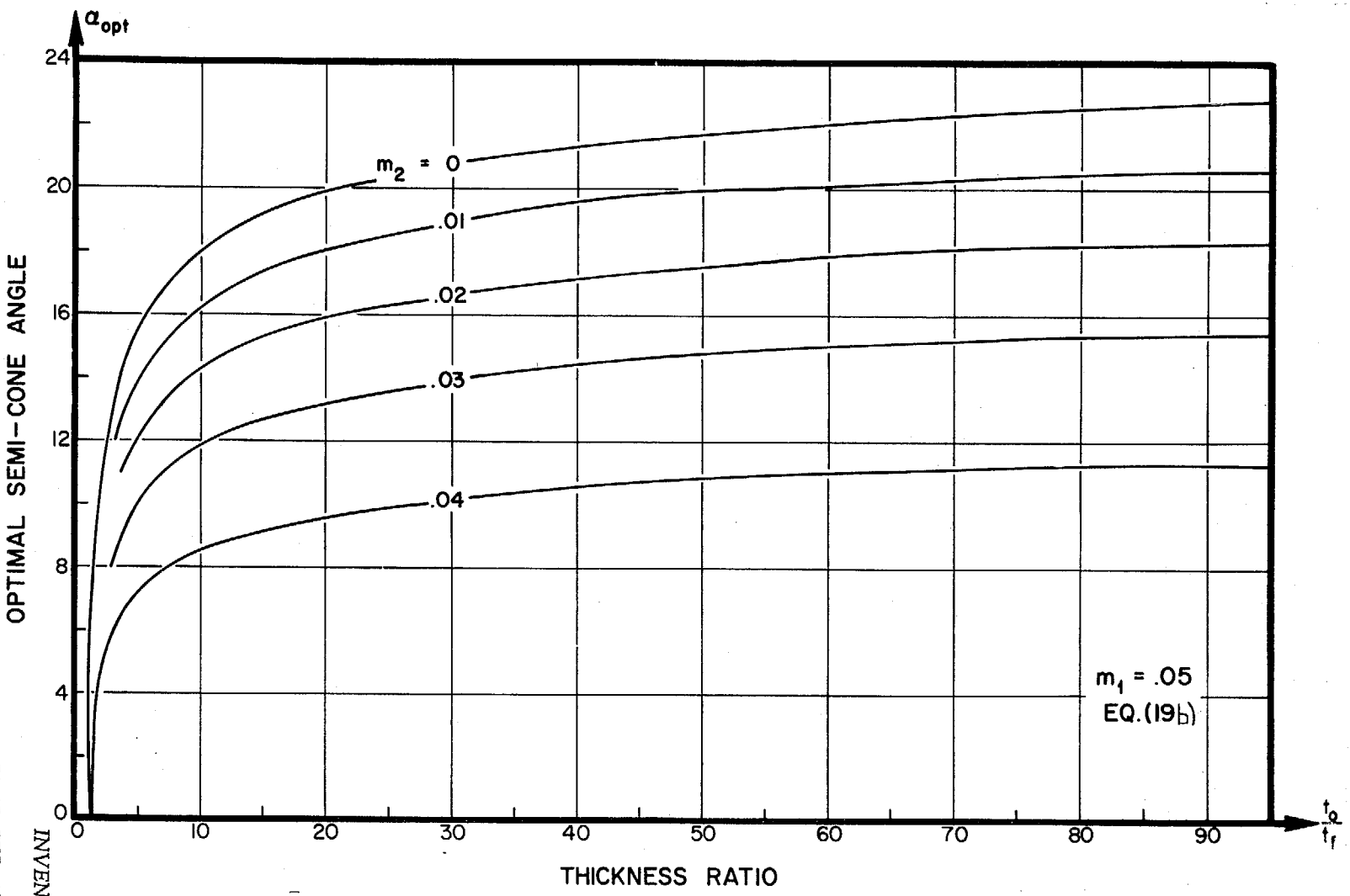
FIG.16 OPTIMAL SEMI-CONE ANGLE OF THE DIE AS A FUNCTION OF $t_o/t_f$ AND $m_2$.
INVENTOR.
BETZALEL AVITZUR
BY
B. Michelson

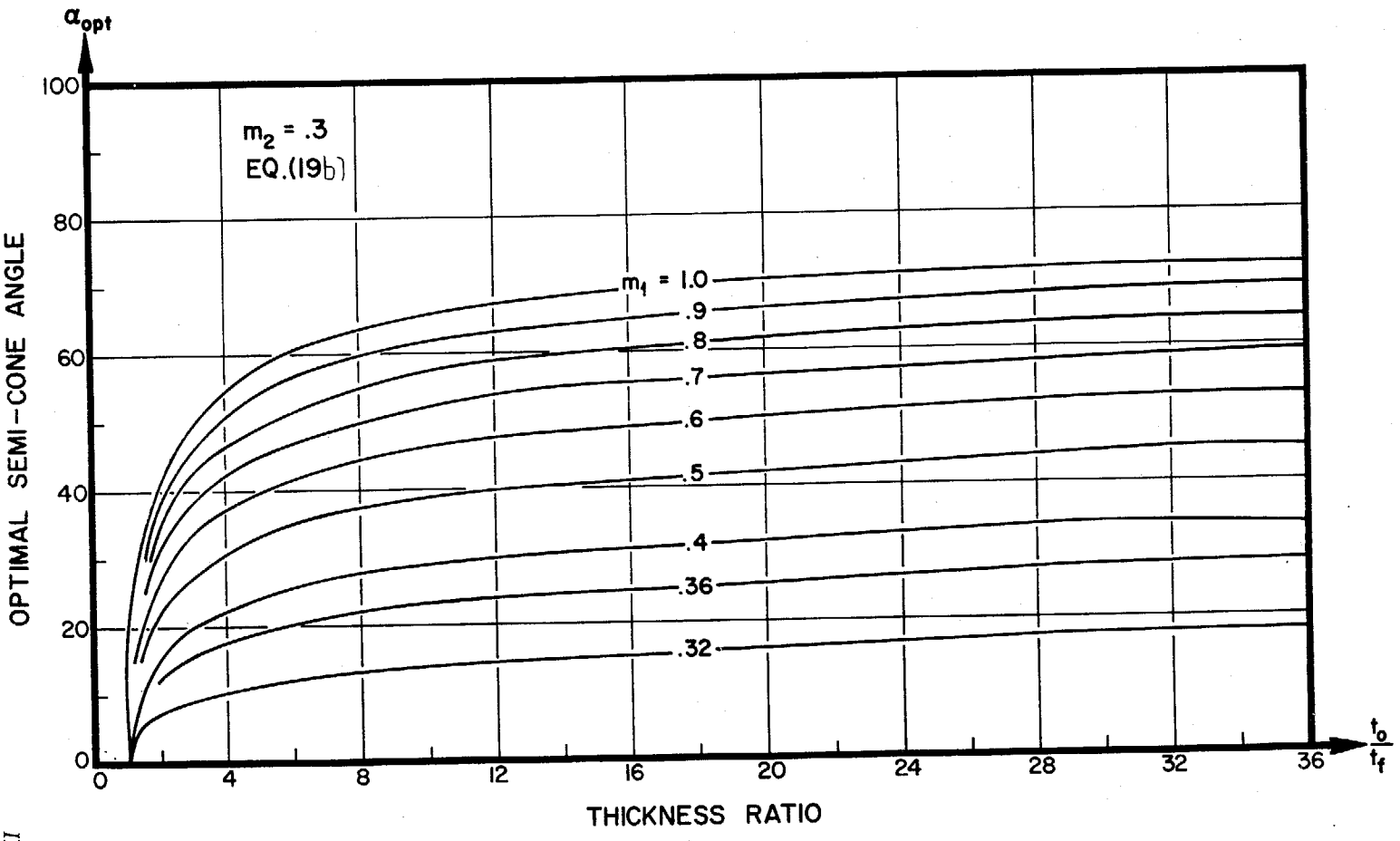
FIG.17 OPTIMAL SEMI-CONE ANGLE OF THE DIE AS A FUNCTION OF $t_o/t_f$ AND $m_1$.
INVENTOR.
BETZALEL AVITZUR
BY

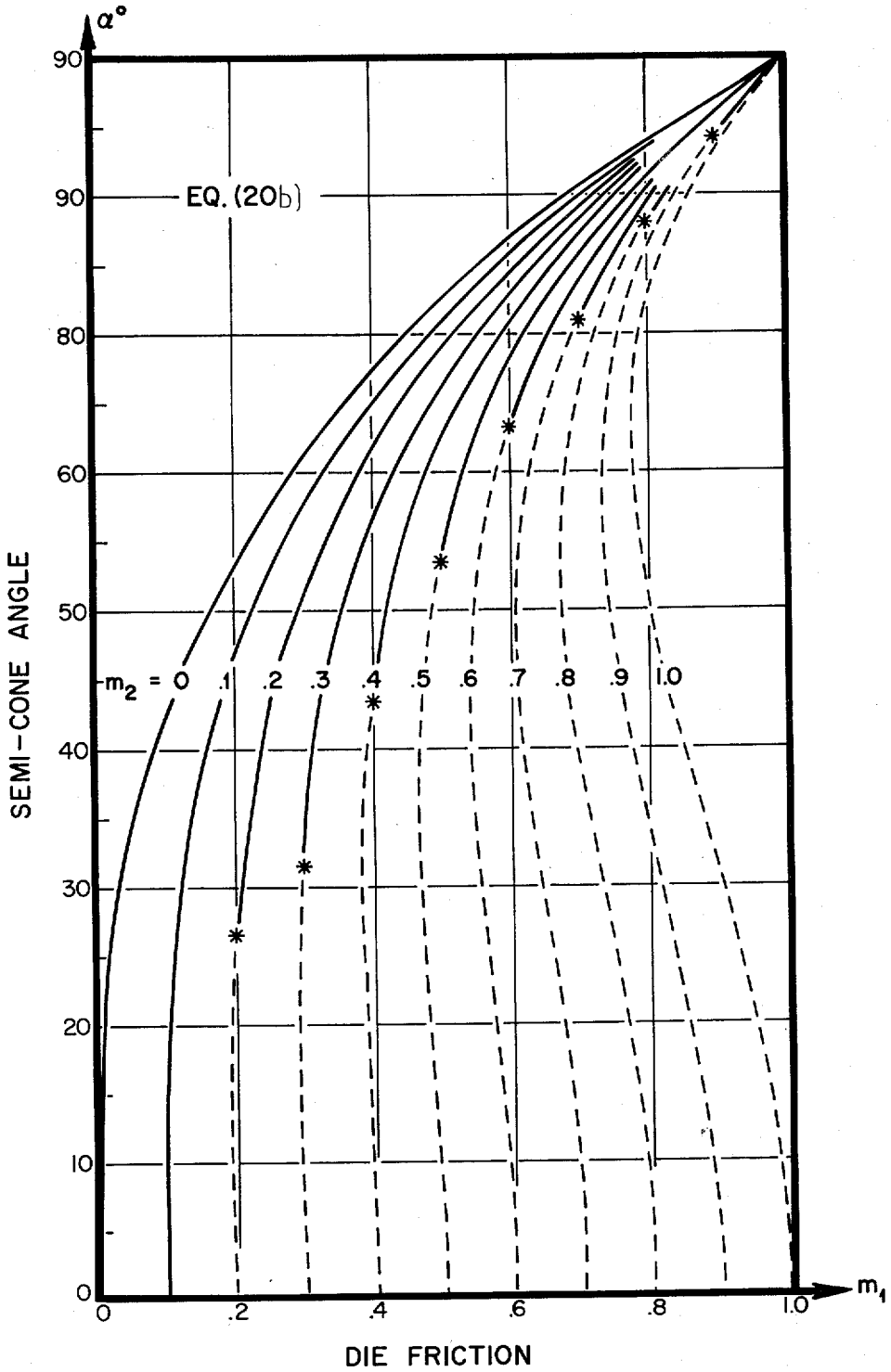
FIG. 18 LIMIT ON OPTIMAL SEMI-CONE ANGLE OF DIE AS $t_o/t_f$ APPROACHES INFINITY.
INVENTOR.
BETZALEL AVITZUR
BY

SHAPING OF HOLLOW WORKPIECES

Matter enclosed in heavy brackets [ ] appears in the original patent but forms no part of this reissue specification; matter printed in italics indicates the additions made by reissue.

---

This invention relates to the shaping of hollow workpieces, and more particularly to the ironing or the combined drawing and ironing of tubular or cup-shaped workpieces such as the bodies of cans for beverages or food preservation, shell bodies for ammunition, and the like.

Ironing is frequently carried out after a deep drawing or cupping operation. The latter is best suitable for material of medium or heavy gauge and results in a hollow workpiece of relatively restricted depth. The succeeding ironing operation which is performed by means of a mandrel or punch and a die, serves to reduce the wall thickness of the hollow workpiece and increase the length thereof in an economical manner.

Heretofore, however, the reduction in wall thickness obtainable per die has been relatively small due to the development of high tensile stresses in the portion of the workpiece being ironed. In normal practice, ironing has been restricted to a reduction per die of less than 50%. To effect larger reductions, passes through successive dies have been needed and this has mostly been done over one mandrel with several dies being arranged in tandem. In this practice a long stroke is necessary, and the required long mandrel often results in eccentricity and non-uniformity in wall thickness.

It is an object of the invention to avoid eccentricity and improve wall thickness uniformity in the ironed workpiece, which will result in savings in material.

It is also an object of the invention to improve the ironing procedure so that greater reductions in wall thickness will be obtainable per die.

It is another object of the invention to improve the ironing operation in a manner such that under certain conditions the total required conventional reduction in wall thickness may be obtained during passage of the workpiece through a single ironing die.

It is a further object of the invention to reduce or minimize tensile stresses developed in the ironed portion of the workpiece during the ironing operation.

It is a still further object of the invention to reduce expenses for dies and other parts of the required apparatus by reducing the number of individual ironing steps.

It is an additional object of the invention to increase the rate of production and thus render the operation more economical.

It is likewise an object of the invention to provide a combined deep drawing and ironing procedure in which the ironing step is carried out in an improved manner.

Further objects, advantages and features of the invention will become apparent as the description proceeds.

In the drawings which illustrate the invention by way of example,

FIGS. 3a to 18 are diagrams plotting certain variables which are significant in connection with the invention.

1. General Description

Figure 1A:
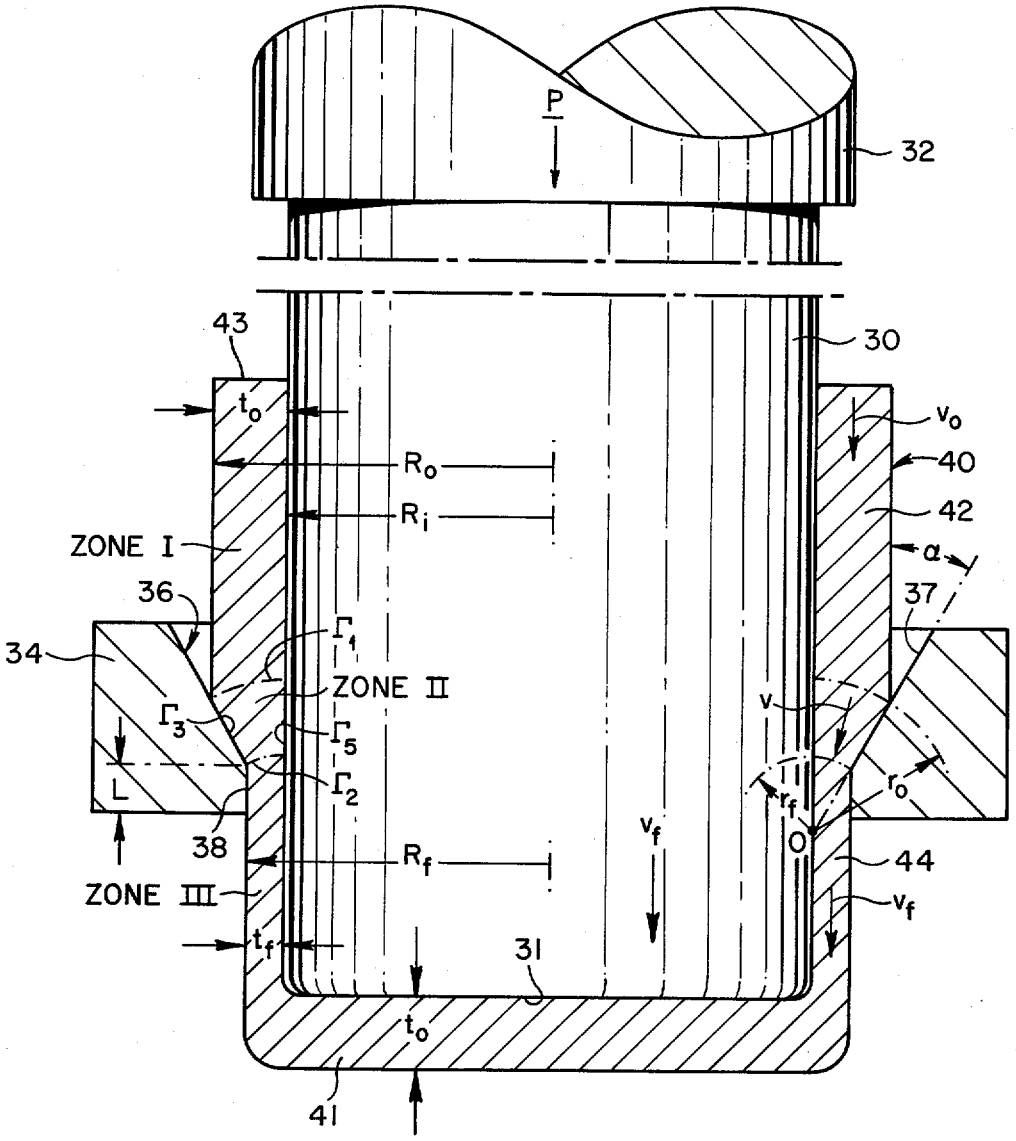
FIG. 1a is a diagrammatic fragmentary section showing the ironing of a cup-shaped workpiece in accordance with the invention.

Referring to FIG. 1a, the arrangement shown therein comprises an ironing mandrel or punch 30 having a front face 31, the punch being connected at its rear end to actuating means such as a ram 32 of a press. A die 34 cooperates with the punch and is provided with an aperture generally indicated at 36. This aperture 36 extends through the die and includes a tapered or conical portion 37 having a semi-cone angle $\alpha$, and a substantially cylindrical portion or land 38 of the length L.

Before the start of an ironing operation, punch 30 is caused to engage the interior of a hollow workpiece generally indicated at 40 and consisting of metal such as aluminum or steel and the like. The workpiece has a cup-like shape preformed during a preceding deep drawing or cupping operation and comprises a bottom 41 and an integral side wall 42 of tubular shape which extends to a rear or end face 43. Designating certain dimensions of the workpiece before ironing as original and after ironing as final, the side wall 42 has an original outer radius $R_o$, a constant inner radius $R_i$ which further represents the outer radius of the punch, and an original wall thickness $t_o$ which is usually much smaller than the radius $R_i$. The bottom 41 may likewise have the original wall thickness $t_o$.

When the ironing operation starts, punch 30 with the workpiece 40 thereon is advanced into aperture 36 of the die so that material of the workpiece will be forced to flow through the conical portion 37 of the die aperture and the thickness of side wall 42 will be reduced while the length thereof will be increased so as to form an ironed portion 44 of the side wall. The ironed portion has a final outer radius $R_f$ which likewise represents the approximate inner radius of land 38 of the die, and a final wall thickness $t_f$ corresponding substantially to the width of the gap between punch 30 and land 38. The movement of punch 30 will normally be continued until the entire workpiece has been passed through die 34.

Ram 32 is adapted to exert an ironing force indicated at P which is applied to punch 30 and may be transmitted to the workpiece partly through friction in the area of deformation and partly through pressure of front face 31 of the punch on bottom 41. The latter pressure will cause the development of tensile stresses in the workpiece portion 44 being ironed. Heretofore, friction at the punch has been relatively low and, therefore, the ironing force has been transmitted largely through pressure upon bottom 41 of the cup so that tensile stresses in the ironed portion 44 of the workpiece have been relatively high. This has severely restricted the reduction obtainable during passage through one die since the bottom 41 would be torn off in case the tensile stresses exceed a certain limit.

In the improved procedure, differential friction is provided in a manner such that the workpiece is subjected to a relatively large frictional force resulting from contact of the interior surface of the side wall of workpiece 40 with punch 30, and to a smaller frictional force resulting from movement of the outer surface of the side wall of workpiece 40 through the die aperture 36. Accordingly a large portion of force P, or even the entire force, may be transmitted from punch 30 to the workpiece by friction directly in the area where the deformation takes place, while the transmission of forces from front face 31 of the punch to bottom 41 of the cup will be decreased or completely eliminated so that tensile stresses in the ironed portion 44 will be minimized and thus larger reductions in wall thickness will be possible per die. When using the improved method, reductions per die range from 50 percent upwards and meet all practical requirements. For example, a wall thickness of 0.032 inch has been reduced to 0.008 inch, that is, by 75 percent, in a single die. If desired, it is possible to complete the entire ironing procedure during passage through a single ironing die, that is, the workpiece may be ironed to a final degree during such passage.

The required amount of differential friction may be obtained, e.g., by relatively limited lubrication or absence of lubrication at the inner surface of side wall 42 and more intense lubrication of the area in which the outer surface of the side wall passes through the die; or by providing the punch 30 with a surface rougher than that of the conical portion 37 of die aperture 36; or by a combination of such means. Suitable selection of the semi-cone angle $\alpha$ of the die will likewise assist in controlling the differential friction.

Some further details of FIG. 1a will be explained in a subsequent part of the description and it will be set forth that care should be taken to allow for proper stripping of the punch after ironing when punch friction is high.

Figure 1B:
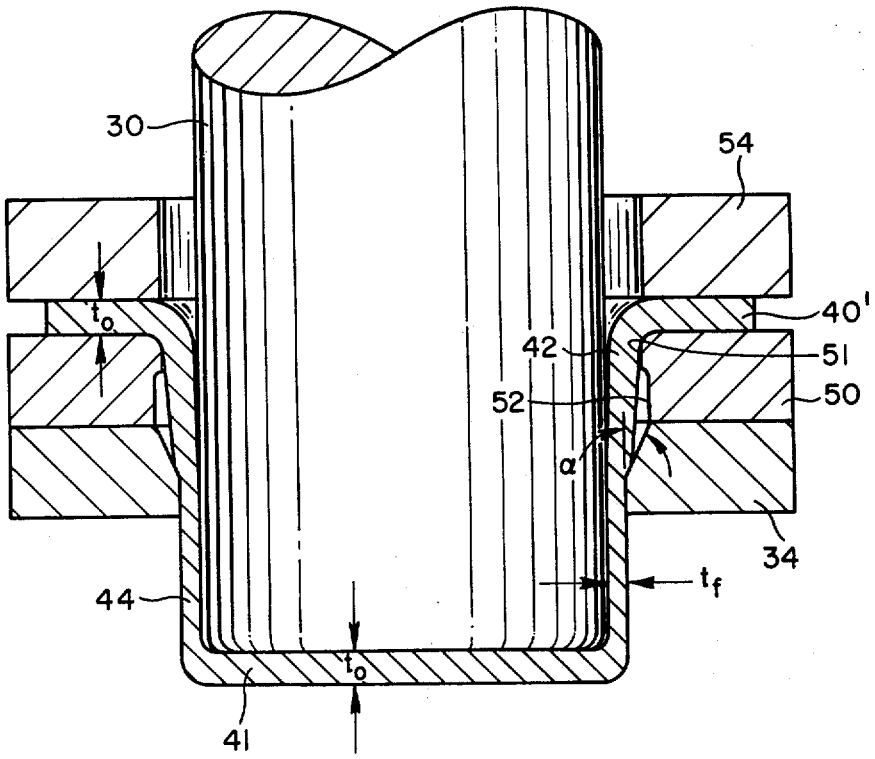
FIG. 1b is a diagrammatic fragmentary section showing the combined drawing and ironing of a cup-shaped workpiece in accordance with the invention.
Figure 1C:
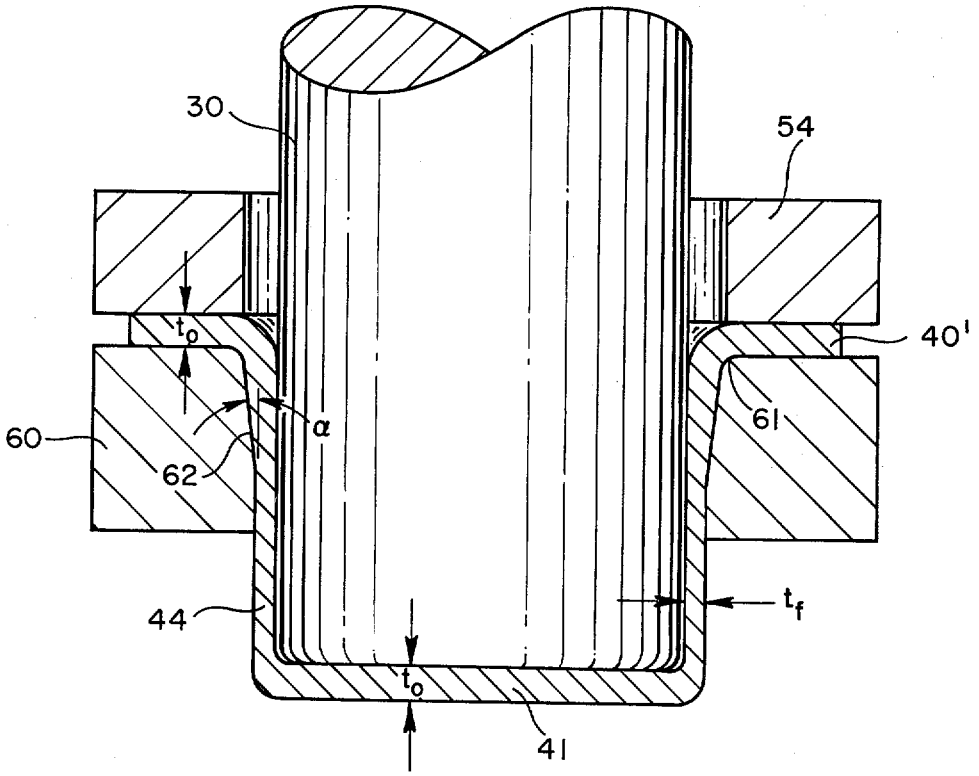
FIG. 1c is similar to FIG. 1b, but shows a modification.

FIGS. 1b and 1c illustrate modified procedures in which a deep drawing or cupping operation is combined with the improved ironing operation and both steps are carried out during one stroke of the punch.

In FIG. 1b a drawing die 50 is superimposed upon the ironing die 34 having the semi-cone angle $\alpha$. The drawing die 50 is provided with a cylindrical aperture 51 effective during drawing, and with a recess 52. A hold-down plate 54 of standard type surrounds punch 30 which is actuated by a ram such as indicated at 32 in FIG. 1a. Similar actuating means (not shown) are provided for operating the hold-down plate 54.

At the start of an operation, a blank in the form of a substantially flat sheet, the end of which is visible at 40' and which has the original wall thickness $t_o$, is caused to abut the top of drawing die 50 and will then be engaged by the hold-down plate 54. When punch 30 is advanced, the blank will be drawn into the die aperture 51 so as to receive a cup-like shape including side wall 42 and integral bottom 41 while still substantially retaining the original wall thickness $t_o$. Upon further advance of the punch, material of the cup is forced to flow into the ironing die 34 and the side wall will be thinned and elongated in the improved manner set forth in connection with FIG. 1a until the final wall thickness $t_f$ is reached at the ironed portion 44 of the workpiece.

The height of die 50 may be adjusted so that ironing will commence after deep drawing is completed. However, the drawing force will gradually diminish towards the end of the deep drawing stroke. As shown in FIG. 1b, therefore, the drawing portion 51 of the die aperture may be arranged so close to the effective part of ironing die 34 that ironing will start before termination of the deep drawing step and thus the total punch stroke will be relatively short.

As explained in greater detail later, tensile stresses in the ironed portion of the side wall may be eliminated entirely by differential friction in conjunction with other suitable measures, that is, by intentionally making punch friction sufficiently higher than die friction, adjusting the semi-cone angle of the die, etc. In that case, when tensile stress in the ironed side wall portion is zero, ironing may commence as soon as the bottom of the deep drawn cup emerges from the drawing die. Under such conditions a single combined drawing and ironing die may be provided.

FIG. 1c shows such integral drawing and ironing die 60 having a rounded corner 61 which merges into a conical ironing portion 62 of the die aperture. In other respects, the arrangement of FIG. 1c is similar to that of FIG. 1b. However, immediately after the material of blank 40' has been drawn past the rounded corner 61, ironing will commence. The operation will be completed in the manner described in connection with FIG. 1b.

Figure 1D:
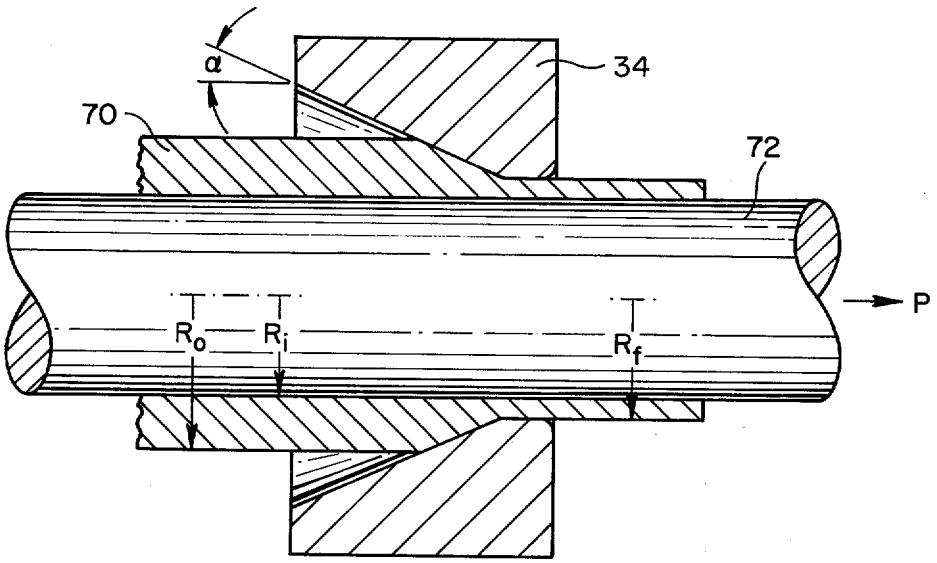
FIG. 1d is a diagrammatic fragmentary section showing the ironing of a tube in accordance with the invention.

FIG. 1d illustrates an application of the invention to the ironing of a tube 70 by means of a draw bench or similar mechanism (not shown). Die 34 corresponds to the die shown in FIG. 1a, and the semi-cone angle thereof is designated $\alpha$. A mandrel 72 is pulled forward by the force P, dragging the tube along solely by friction and causing it to be reduced in thickness while the length is increased during passage through the die. As in FIG. 1a, $R_i$ represents the constant internal radius of the workpiece and further the outer radius of the mandrel, $R_o$ is the original outer radius of the workpiece, and $R_f$ the final outer radius after ironing. Here again, friction at the mandrel is higher than friction at the die and the conditions are similar to those set forth with respect to the ironing of cup-shaped workpieces.

2. Velocity of Material

Reverting to FIG. 1a, there are three zones of velocity of the material. In Zone I, the material moves as a rigid body in the axial direction at an original velocity $v_o$. Zone I is bounded by the end face 44, by two cylinders of radii $R_i$ and $R_o$, respectively, and by a toroidal surface $\Gamma_1$ which in the sectional view is arc-shaped, a coordinated center O and radius $r_o$ being shown at the right hand side of FIG. 1a. Center O which represents an apex for angle $\alpha$ is located on a circle formed by intersection of the extended conical surface of the die aperture and the surface of the punch, the intersection circle having the radius $R_i$.

Zone II is an area in which plastic deformation takes place, and any particle or point therein will move in an axial plane towards the respective center or apex O at a varying speed v. This zone is bounded by the toroidal surface $\Gamma_1$, by a surface $\Gamma_5$ representing a portion of a cylinder of radius $R_i$, by a toroidal surface $\Gamma_2$ formed about the apex O and having a radius $r_f$, and by a conical surface $\Gamma_3$ which is a portion of the inner conical surface 37 of aperture 36 of the die.

Zone III represents the ironed portion 44 moving as a rigid body in the axial direction of the workpiece at a final velocity $v_f$. This zone is bounded by the toroidal surface $\Gamma_2$, by two cylinders of radii $R_i$ and $R_f$, and by a portion of the outer surface of bottom 41.

It will be clear that the areas $\Gamma_1$, $\Gamma_2$, $\Gamma_3$ and $\Gamma_5$ are surfaces of velocity discontinuity.

Because of volume constancy, the ratio of original velocity to final velocity is $$\frac{v_f}{v_o} = \frac{R_o^2 - R_i^2}{R_f^2 - R_i^2} \approx \frac{t_o}{t_f} \quad (1).$$

Since the original wall thickness $t_o$ is much smaller than the final outer radius $R_f$, the cup-shaped workpiece can be approximated by a flat strip in plane strain.

Figure 2:
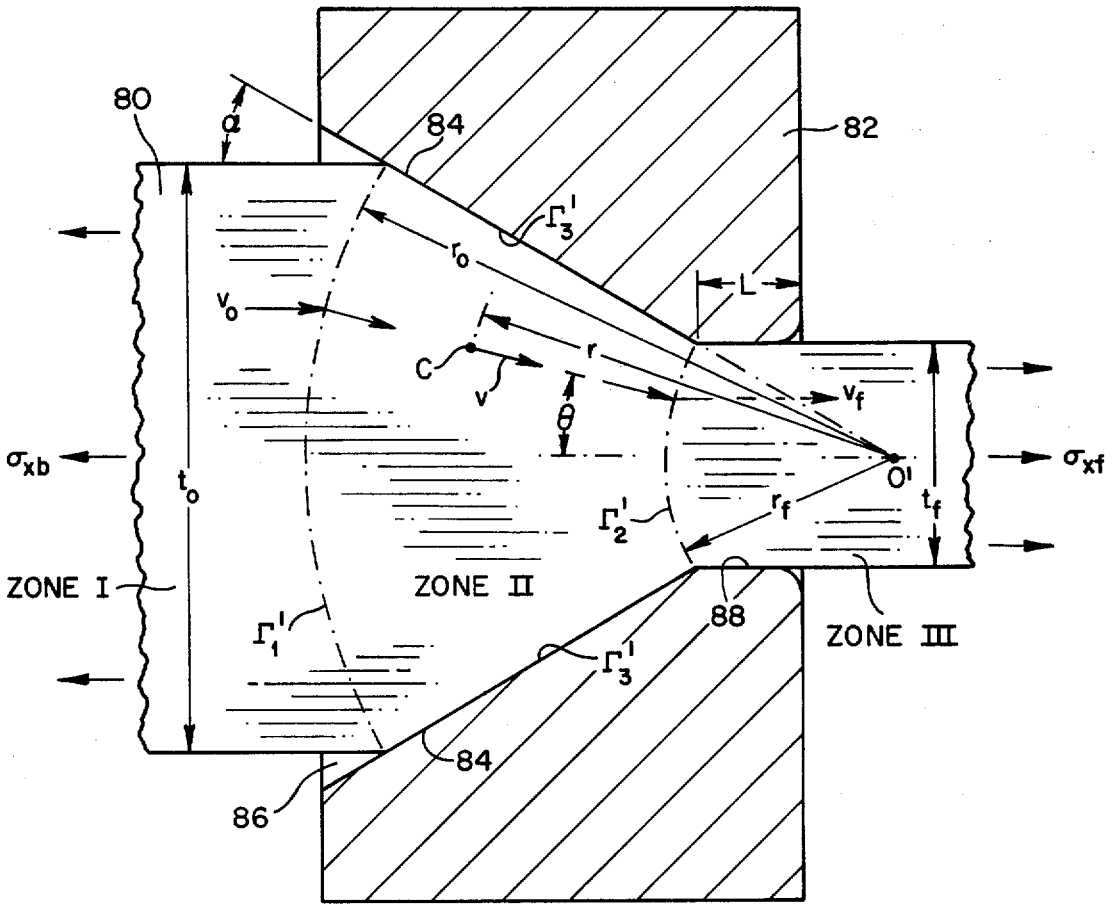
FIG. 2 is an auxiliary illustration in the form of a large-scale diagrammatic fragmentary section showing the pulling or drawing of a solid strip.

FIG. 2 which is an auxiliary illustration shows such flat strip 80 in plane strain. Strip 80 is pulled or drawn through an apertured die 82 having a pair of inclined, plane surfaces 84, a pair of opposite straight surfaces 86 (only one of which is shown), and a land 88. The angle of inclination $\alpha$, the length L of land 88, the original thickness $t_o$, and the final thickness $t_f$ correspond to respective characteristics in preceding figures. The strip width in a direction perpendicular to the plane of FIG. 2 is equal to $2\pi R_f$, that is, to the circumference of a circle encompassing the ironed portion of the workpiece in FIGS. 1a to 1d. Two surfaces of velocity discontinuity $\Gamma_1'$ and $\Gamma_2'$ which have the shape of cylinder portions are formed about an axis perpendicular to the plane of FIG. 2 through center or apex 0′, and have radii $r_o$ and $r_f$, respectively. A pair of plane surfaces of velocity discontinuity $\Gamma_3'$ represent portions of the opposite inclined surfaces 84. Front pull stresses are indicated at $\sigma_{xf}$, and any existing back pull stresses at $\sigma_{xb}$.

Zones I, II, III and the velocities $v_o$, v, $v_f$ correspond to respective zones and velocities in FIG. 1a.

In Zone II any particle or point C located in the plane of FIG. 2 and determined by radius r and angle $\theta$ as the coordinates will move at the only non-zero velocity component v towards the apex 0′. The value of v is determined by the equation $$v = v_f r_f (\cos \theta / r) \quad (2),$$

compare "Metal Forming: Processes and Analysis" by B. Avitzur, McGraw-Hill Book Company, 1968, Eq. (14.2) on page 400, the minus symbol for indicating the direction of flow being omitted herein.

With the aid of the foregoing consideration of the flow of solid material through inclined planes, the problem of the ironing of hollow workpieces will now be treated further.

3. Conditions under Constant Friction

As is well known, frictional forces represent shear stress in material at its boundary and may be determined in various ways, one of which is based on the assumption that shear stress and thus friction are independent of pressure and velocity. Such supposition leads to the use of a constant friction factor for a given tool and workpiece under constant surface and temperature conditions and is suitable in particular if the velocity is limited. Lubricant may or may not be used.

This part of the description deals with the ironing of hollow workpieces under the assumption of constant friction.

3.1 Wall Tension and Punch Force

In the case of solid material, the front pull stress $\sigma_{xf}$ is determined by Eq. (14.16) on page 405 of the book referred to.

If in the ironing of hollow workpieces it is assumed that no friction exists at the punch, then the last-mentioned equation is applicable in a somewhat modified form:

$$\left.\frac{\sigma_{xf}}{\frac{2}{\sqrt{3}}\sigma_o}\right|_{m_2=0} = \frac{E(\alpha, \sqrt{3}/2)}{\sin\alpha} \cdot \ln \frac{t_o}{t_f} + \frac{1-\cos\alpha}{\sin\alpha} + \frac{m_1}{2}\left(\cot\alpha \ln \frac{t_o}{t_f} + \frac{L}{t_f}\right) + \frac{\sigma_{xb}}{\frac{2}{\sqrt{3}}\sigma_o} \quad (3);$$

in this equation and in subsequent parts of the description, $\sigma_o$ = yield or flow stress of material of the workpiece, $m_1$ = constant friction factor at conical portion of die aperture, $m_2$ = constant friction factor at mandrel or punch, and $E\left(\alpha, \frac{\sqrt{3}}{2}\right)$ = elliptic integral of second order $$= \int_{\theta=0}^{\alpha} \sqrt{1 - \frac{3}{4}\sin^2\theta}\, d\theta.$$

The elliptic integral is treated on pages 402 et seq. and 429 et seq. of the book referred to and values of this integral are stated for $\alpha$ ranging from zero to 90° in a table on page 404. It is apparent from this table that for values of $\alpha$ ranging up to approx. 55°, the elliptic integral $$E\left(\alpha, \frac{\sqrt{3}}{2}\right)$$

can be replaced by sin $\alpha$ with an error not exceeding 5 percent.

When friction at the punch is zero, the ironing force $P_o$ (P at zero punch friction) required for a cup-shaped workpiece will be $$P_o = 2\pi R_f t_f \sigma_{xf}$$

$$= \frac{2}{\sqrt{3}}\sigma_o \cdot 2\pi R_f t_f \left\{ \frac{E(\alpha, \sqrt{3}/2)}{\sin\alpha} \cdot \ln \frac{t_o}{t_f} + \frac{1-\cos\alpha}{\sin\alpha} + \frac{m_1}{2}\left(\cot\alpha \cdot \ln \frac{t_o}{t_f} + \frac{L}{t_f}\right) + \frac{\sigma_{xb}}{(2/\sqrt{3})\sigma_o} \right\} \quad (4).$$

Friction losses occurring along the punch surface $\Gamma_5$ (FIG. 1a) and caused by shear stresses in the workpiece will be designated $\dot{W}_{s5}$ (work per unit of time under shear stress at $\Gamma_5$) and can be computed as follows:

$$\dot{W}_{s5} = 2\pi R_i\, m_2 \frac{\sigma_o}{\sqrt{3}} \int_{r=r_f}^{r_o} (v_f + v)dr \qquad (5).$$

Substituting v from Eq. (2) and $r_f = t_f/\sin\alpha$ from geometric calculation, Eq. (5) becomes $$\dot{W}_{s5} = 2\pi R_i\, m_2 \frac{\sigma_o}{\sqrt{3}} v_f \int_{r=r_f}^{r_o} \left[1 - \frac{t_f}{\sin\alpha} \cdot \frac{\cos\theta}{r}\right] dr \qquad (6).$$

Since $\theta$ at $R = R_i$ is zero and, therefore, $\cos\theta = 1$, $$\dot{W}_{s5} = 2\pi R_i m_2 \frac{\sigma_o}{\sqrt{3}} v_f \left[(r_o - r_f) - \frac{t_f}{\sin\alpha} \cdot \ln\frac{r_o}{r_f}\right] \qquad (7).$$

Since $r_f = t_f/\sin\alpha$ and $R_i \approx R_f$, $$\dot{W}_{s5} = 2\pi R_f m_2 \cdot \frac{\sigma_o}{\sqrt{3}} \cdot v_f \frac{t_f}{\sin\alpha} \left[\left(\frac{t_o}{t_f} - 1\right) - \ln\frac{t_o}{t_f}\right] \qquad (8).$$

When the friction losses over the punch surface $\Gamma_5$, as given by Eq. (8), are divided by the final velocity and added to the power requirement on the punch, as given by Eq. (4), then the total force P is determined by the equation $$P = P_o + \frac{\dot{W}_{s5}}{v_f} = \frac{2}{\sqrt{3}} \sigma_o \cdot 2\pi R_f t_f \left\{\frac{E(\alpha, \sqrt{3}/2)}{\sin\alpha} \cdot \ln\frac{t_o}{t_f} + \frac{1-\cos\alpha}{\sin\alpha} + \frac{m_1}{2}\left(\cos\alpha \cdot \ln\frac{t_o}{t_f} + \frac{L}{t_f}\right) + \frac{m_2}{2\sin\alpha}\left[\left(\frac{t_o}{t_f} - 1\right) - \ln\frac{t_o}{t_f}\right] + \frac{\sigma_{xb}}{(2/\sqrt{3})\sigma_o}\right\} \qquad (9a).$$

The "Weighted Ironing Force", that is, the relative ironing force, is defined by $$P' = \frac{P}{(2/\sqrt{3})\sigma_o \cdot 2\pi R_f t_f} \qquad (9b).$$

The characteristics of Eq. (9b) are plotted in FIGS. 3a to 5, with the semi-cone angle $\alpha$ of the die as the abscissa and the "Weighted Ironing Force" P' as the ordinate. The parameters are $m_2$, $t_o/t_f$, and $m_1$ in FIGS. 3a, b; 4a, b; and 5, respectively.

The "Weighted Ironing Force" P' as a function of die angle $\alpha$ is passing through a minimum. The Ironing Force increases with an increase in punch friction $m_2$ and die friction $m_1$, in reduction $t_o/t_f$, in land L, in wall tension $\sigma_{xb}$ at the entrance, in cup radius $R_i$ and thickness $t_f$, and also with the yield strength $\sigma_o$ of the cup.

As stated hereinbefore, at least a part of the punch force P is transmitted to the cup through friction over the punch surface $\Gamma_5$. The force transmitted by punch friction is $$P_f = 2\pi R_i(r_o - r_f) m_2 \frac{\sigma_o}{\sqrt{3}} \approx 2\pi R_f \frac{t_f}{\sin\alpha}\left(\frac{t_o}{t_f} - 1\right) m_2 \frac{\sigma_o}{\sqrt{3}} \qquad (10).$$

Actually, the length of the punch surface $\Gamma_5$ extends beyond the limits of $r_f \leq r \leq r_o$. However, it is questionable if friction at the punch for $r < r_f$ relieves wall tension. To be conservative, $\Gamma_5$ is considered to extend only to $r_f \leq r \leq r_o$.

As stated, any remaining force is transmitted from the punch to the bottom of the cup, causing tension in the side wall of the emerging cup. The force transmitted through the emerging side wall of the cup is $P - P_f$ and the relative tension on the side wall becomes $$\frac{\sigma_{xf}}{(2/\sqrt{3})\sigma_o} = \frac{P - P_f}{2\pi R_f t_f (2/\sqrt{3})\sigma_o} = E\frac{(\alpha, \sqrt{3}/2)}{\sin\alpha} \cdot \ln\frac{t_o}{t_f} + \frac{1-\cos\alpha}{\sin\alpha} + \frac{m_1}{2}\left(\cot\alpha \cdot \ln\frac{t_o}{t_f} + \frac{L}{t_f}\right) - \frac{m_2}{2\sin\alpha} \cdot \ln\frac{t_o}{t_f} + \frac{\sigma_{xb}}{\frac{2}{\sqrt{3}}\sigma_o} \qquad (11).$$

The larger $m_2$, the lower will be $\sigma_{xf}$.

The characteristics of Eq. (11) are presented in FIGS. 6a–8, with the semi-cone angle $\alpha$ of the die as the abscissa and the relative ironing stress $\sigma_{xf}/(2/\sqrt{3})\sigma_o$ as the ordinate. The parameters are $m_2$; $t_o/t_f$; and $m_1$, in FIGS. 6a,b; 7a,b; and 8, respectively.

The following observations can be made from Eq. (11) and FIGS. 6a–8.

1. Relative wall tension decreases with an increase in punch or mandrel friction $m_2$ and with a decrease in die friction $m_1$.

2. Relative wall tension increases with an increase in reduction $$t_o/t_f \text{ if } m_2 < 2E\left(\alpha, \frac{\sqrt{3}}{2}\right) + m_1 \cos\alpha$$

and decreases if $$m_2 > 2E\left(\alpha, \frac{\sqrt{3}}{2}\right) + m_1 \cos\alpha.$$

3. When die friction is higher than punch or mandrel friction ($m_1 > m_2$), an increase in die angle $\alpha$, from very small values and up, causes first a decrease and then an increase in wall tension, passing through a minimum at an optimal die angle. The latter will be dealt with in connection with FIG. 18.

4. When die friction is equal to or lower than punch or mandrel friction ($m_1 \leq m_2$), an increase in die angle $\alpha$ causes an increase in wall tension. There exists a critical die angle; with dies of an angle smaller than the critical (that is, the intersection of each respective line with the abscissa), wall tension vanishes. Zero wall tension and critical die angle will be discussed further in subsequent parts of the description.

3.2 Maximum Possible Reduction

Rearranging Eq. (11) to solve for the reduction as an exponential function of the other variables, the following equation is obtained:

$$\frac{t_o}{t_f}=\exp\left\{\frac{\frac{\sigma_{xf}-\sigma_{xb}}{(2/\sqrt{3})\sigma_o}-\frac{1-\cos\alpha}{\sin\alpha}-\frac{m_1}{2}\cdot\frac{L}{t_f}}{\frac{E(\alpha,\sqrt{3}/2)}{\sin\alpha}+\frac{m_1}{2}\cos\alpha-\frac{m_2}{2\sin\alpha}}\right\} \quad (12).$$

When ironing is performed in sequence with deep drawing during the same stroke as shown in FIGS. 1b and 1c, then $\sigma_{xb}$ of Eqs. (11) and (12) is the drawing stress required to perform the deep drawing operation.

When $\sigma_{xf}$ is maximum, $\sigma_{xf}=(2/\sqrt{3})\,\sigma_o$, and $\sigma_{xb}=0$, Eq. (12) reduces to $$\left.\frac{t_o}{t_f}\right|_{max.}=\exp\left\{\frac{\sin\alpha-(1-\cos\alpha)-\frac{m_2}{2}\cdot\frac{L}{t_f}\cdot\sin\alpha}{E(\alpha,\sqrt{3}/2)+\frac{m_1}{2}\cos\alpha-\frac{m_2}{2}}\right\} \quad (13a).$$

The characteristics of Eqs. (12) and (13a) are presented by FIGS. 9–12, with the semi-cone angle $\alpha$ of the die as the abscissa and $t_o/t_f$ as the ordinate. The punch friction factor $m_2$ is the parameter in FIGS. 9 and 11, and $m_1$ is the parameter in FIGS. 10 and 12. In FIGS. 9 and 10 the wall tension is maximum $\sigma_{xf}=(2/\sqrt{3})\,\sigma_o$, and in FIGS. 11 and 12 the wall tension vanishes $\sigma_{xf}=0$. When wall tension $\sigma_{xf}$ is permitted to attain its maximum value $=(2/\sqrt{3})\,\sigma_o$, then the maximum possible thickness ratio $t_o/t_f$ increases with an increase in punch or mandrel friction $m_2$ and with a decrease in die friction $m_1$. When $m_2 \geq m_1$, then an increase in the die angle $\alpha$ causes a decrease in the maximum possible ratio $t_o/t_f$. When $m_2 < m_1$, the maximum possible ratio $t_o/t_f$ as a function of die angle $\alpha$ passes through a maximum, and is equal to 1 (no reduction) when $\alpha=0$. The lines respective to friction values $m_2$ or $m_1$ or FIGS. 11 and 12 define the boundary for the range of die angle $\alpha$ and reduction $t_o/t_f$ in which ironing with no wall tension ($\sigma_{xf}=0$) is possible. When $m_1 \geq m_2$, ironing with no wall tension is impossible. When $m_2 > m_1$, the range of die angles and reductions in which ironing with no wall tension is possible increases with an increase in $m_2$ and a decrease in $m_1$. Larger reductions and smaller angles are advantageous when $m_2 > m_1$.

In plotting $t_o/t_f$ as a function of $\alpha$ with the aid of Eq. (13a), $t_o/t_f$ is exponential for some angle $\alpha$ and for each combination of $m_1$ and $m_2$ for which $m_1 < m_2$. To find the limiting $\alpha$ for which $t_o/t_f$ approaches infinity, the denominator in Eq. (13a) is set at zero:

$$E(\alpha,\sqrt{3}/2)+\frac{m_1}{2}\cos\alpha-\frac{m_2}{2}=0 \quad (13b).$$

As stated, when the expected limiting angle $\alpha$ is small and does not exceed about 55° then $E(\alpha,\sqrt{3}/2)\approx\sin\alpha$ and Eq. (13b) reduces to $$2\sin\alpha+m_1.\cos\alpha-m_2=0 \quad (13c).$$

The characteristics of Eq. (13c) are presented by FIG. 13. In FIG. 13 the abscissa is $m_2$, the ordinate $\alpha$, and the parameter $m_1$. Each combination of $m_2$ and $m_1$ (when $m_2 > m_1$) determines through Eq. (13c) or (13b) and through FIG. 13 the asympotote for the respective lines in FIGS. 9 to 12.

3.3 Critical Required Punch Friction

From Eq. (11) a demand on punch friction $m_2$ can be set at $$m_2>2E(\alpha,\sqrt{3}/2)+2\,\frac{1-\cos\alpha}{\ln(t_o/t_f)}+m_1\left[\cos\alpha+\frac{L}{t_f}\,\frac{\sin\alpha}{\ln(t_o/t_f)}\right]+2\cdot\frac{\sigma_{xb}-\sigma_{xf}}{(2/\sqrt{3})\sigma_o}\cdot\frac{\sin\alpha}{\ln(t_o/t_f)} \quad (14).$$

The demand on $m_2$ will be least severe when $\sigma_{xb}=0$, $L=0$, and $\sigma_{xf}=(2/\sqrt{3})\,\sigma_o$, so that $$m_2>2E(\alpha,\sqrt{3}/2)-2\cdot\frac{\sin\alpha+\cos\alpha-1}{\ln(t_o/t_f)}+m_1\cos\alpha \quad (15a).$$

The limit of Eq. (15a) for $\alpha=0$ is $$\text{limit}_{\alpha\to 0}\, m_2=m_1 \quad (15b).$$

The limit of Eq. (15a) for $\alpha=90°$ is $$\text{limit}_{\alpha\to 90°}\, m_2=2E(\alpha,\sqrt{3/2})=2.422 \quad (15c).$$

From Eq. (15c) it is obvious that no ironing will occur through a square die. It is possible, however, that a dead zone will form.

When the reduction is set infinitely large, that is, $t_o/t_f \to \infty$, then both Eqs. (14) and (15) for any wall tensions $0 \leq \sigma_{xb} \leq (2/\sqrt{3})\,\sigma_o$ and $0 \leq \sigma_{xf} \leq (2/\sqrt{3})\,\sigma_o$ reduce to:

$$m_2 > 2E(\alpha,\sqrt{3}/2)+m_1\cos\alpha \quad (16a).$$

As stated, for small values of $\alpha$, up to about $\alpha=55°$, $E(\alpha,\sqrt{3}/2)$ can be approximated by $\sin\alpha$ with an error of not more than 5 percent. Therefore, $$m_2 > 2\sin\alpha+m_1\cos\alpha \quad (16b).$$

It is thus shown that if Eq. (14) prevails, then any reduction can be made with no tear of the cup. It is, however, worth mentioning that excessive friction between the punch and cup will cause difficulties when the cup is stripped off the punch. Thus, stripping practice dictates an upper limit on the practical value that $m_2$ can reach; but this condition may be alleviated to some extent as follows.

To ease the stripping off of the product from the punch, the latter may be made of a sleeve and a core. The sleeve core interface may be slightly tapered, and the core diameter so adjusted that the sleeve expands somewhat on the forward stroke and contracts when release is desired. Liquid, elastomer or a like material in the interior of the punch can cause expansion when pressurized and contraction on reversal.

It will be apparent from Eq. (14) that when $t_o/t_f \rightarrow \infty$, the restriction on $m_2$ is independent of the value of $\sigma_{xf}$, see FIG. 14.

Equation (16a) is related to Eq. (13b), and the characteristics can be ascertained from FIG. 13. Here in connection with Eq. (16a) the abscissa in FIG. 13 should be the angle $\alpha$; the ordinate, friction $m_2$; and the parameter, friction $m_1$. For very large reductions when $t_o/t_f \rightarrow \infty$, the value of $m_2$ should be at least that indicated by FIG. 13 to assure ironing.

Further, the characteristics of Eqs. (14) to (16) are presented in FIGS. 13–15b. In FIGS. 14 and 15a,b the semicone angle $\alpha$ of the die is the abscissa and punch or mandrel friction factor $m_2$ is the ordinate, whereas in FIG. 13 the coordinates are reversed. In FIGS. 13 and 15a,b die friction $m_1$ is the parameter, while in FIG. 14 the reduction $t_o/t_f$ is the parameter.

Summarizing, from Eqs. (14) and (16) and FIGS. 13–15b the following observations can be made:

1. The minimum required mandrel friction increases with an increase in die friction. The demand on $m_2$ is much more severe if wall tension is to be eliminated, than when maximum wall tension is permitted. This difference diminishes with increase in reduction (See FIG. 14).

2. When maximum wall tension $\sigma_{xf} = (2/\sqrt{3})\,\sigma_o$ is permitted, small reductions can be made even without any punch or mandrel friction ($m_2 = 0$). Intermediate die angles may minimize or eliminate the demand on $m_2$. With excessive die angles, the demand on punch or mandrel friction $m_2$ is above its maximum possible value of $m_2 = 1$, and ironing is impossible.

3. The thickness ratio effect on $m_2$ varies according to whether or not wall tension is permitted. When wall tension is not permitted, punch or mandrel friction must be higher than when wall tension is permitted, and increasing reductions will decrease the demand on $m_2$ for $m_2 > m_1$ and for a suitable value of $\alpha$, see FIG. 14. When maximum wall tension is permitted, the demand on $m_2$ is always less than when no wall tension is permitted, and the lower the reduction the lower the minimum required punch or mandrel friction for a suitable value of $\alpha$, see FIG. 14.

3.4 Ironing Without Tension

Ironing becomes very attractive if it can be made with no tension ($\sigma_{xf} = 0$), that is, when all the power is transmitted through friction. For example, a tube or other bottomless workpiece can thus be ironed. When $\sigma_{xb} = \sigma_{xf} = 0$, Eq. (14) will be reduced to $$m_2 > 2E\left(\alpha, \frac{\sqrt{3}}{2}\right) + 2\cdot\frac{1-\cos\alpha}{\ln\frac{t_o}{t_f}} + m_1\left(\cos\alpha + \frac{L}{t_f}\cdot\frac{\sin\alpha}{\ln\frac{t_o}{t_f}}\right) \quad (17a).$$

Approximated for small die angles ($\alpha \leqslant 55°$), Eq. (17a) becomes $$m_2 > 2\sin\alpha + 2\cdot\frac{1-\cos\alpha}{\ln\frac{t_o}{t_f}} + m_1\left(\cos\alpha + \frac{L}{t_f}\cdot\frac{\sin\alpha}{\ln\frac{t_o}{t_f}}\right) \quad (17b).$$

The characteristics of Eq. (17b) are presented by FIGS. 13, 14 and 15b which have been discussed.

If $m_2$ is given, the reductions possible, when no tension is permitted on the cup, become, by reduction and modification of Eq. (12), $$\frac{t_o}{t_f} \geqslant \exp\left\{\frac{2(1-\cos\alpha) + m_1\cdot(L/t_f)\sin\alpha}{m_2 - 2E(\alpha, \sqrt{3}/2) - m_1\cos\alpha}\right\} \quad (18)$$

wherein $\alpha$ is equal to, or smaller than, its critical value $\alpha_{cr}$.

The characteristics of Eq. (18) are presented in FIGS. 11 and 12 which have been explained.

The choice of the die cone angle $\alpha$ and the determination of the critical value thereof will be discussed as the description proceeds.

3.5 Choice of the Die Cone Angle

When it is possible to operate with punch friction values greater than those given by Eq. (17a), then no tension is imposed on the walls of the cup. It is desirable to operate with a friction value $m_2$ as high as required but not to reach an excessive value which may cause stripping difficulties. Since $m_2$ is greater for higher values of $m_1$ and L, it is always desirable to minimize each one of the latter characteristics as much as possible. However, a finite value of L is required for manufacturing reasons and for dimensional stability. Also, larger values of L may promote hydrodynamic lubrication which will be dealt with later.

Another factor controlling the value of the critical required factor $m_2$ is the cone angle. The smaller $\alpha$ is, the less severe are the requirements on $m_2$. Thus, $\alpha$ is to be chosen as small as practically possible.

When wall tension is permissible, it is still advisable to minimize this tension. If $m_2$ is a constant, the tension as given by Eq. (11) can be controlled through the choice of the cone angle. When $m_2 \geqslant m_1$, the smaller the cone angle, the less tension is exerted on the walls of the cup. However, if $m_2 < m_1$, then there exists a finite value of $\alpha$ which minimizes the tension (see FIGS. 6 and 8).

Differentiation of Eq. (11) with respect to $\alpha$ and setting the result to be equal to zero leads to $$\left[\sin\alpha\sqrt{1-\frac{3}{4}\sin^2\alpha} - \cos\alpha\cdot E\left(\alpha, \frac{\sqrt{3}}{2}\right) - \frac{m_1}{2} + \frac{m_2}{2}\cos\alpha\right]\ln\frac{t_o}{t_f} + 1 - \cos\alpha = 0 \quad (19a).$$

Equation (19a) can be solved by successive approximations for the optimal value of $\alpha$. Alternatively, Eq. (19a) can be rearranged to read:

$$\frac{t_o}{t_f} = \exp\left\{\frac{1-\cos\alpha}{\frac{m_1}{2} - \frac{m_2}{2}\cos\alpha + \cos\alpha \cdot E\left(\alpha, \frac{\sqrt{3}}{2}\right) - \sin\alpha\sqrt{1-\frac{3}{4}\sin^2\alpha}}\right\} \approx \exp\left\{\frac{1-\cos\alpha}{\frac{m_1}{2} - \frac{m_2}{2}\cos\alpha + \sin\alpha\left[\cos\alpha - \sqrt{1-\frac{3}{4}\sin^2\alpha}\right]}\right\} \quad (19b).$$

The solution of Eq. (19b) is presented in FIGS. 16 and 17. Tensions on the wall of the cup are found for the chosen angle $\alpha$ by Eq. (11).

In FIGS. 16 and 17 the abscissa is the wall thickness ratio $t_o/t_f$ and the ordinate is the optimal semi-cone die angle $\alpha_{opt}$ required to minimize wall tension, while the parameters are $m_2$ and $m_1$, respectively. The optimal cone angle increases with an increase in $m_1$ and with an increase in reduction and also with a decrease in $m_2$, as long as $m_2 < m_1$. The optimal cone angle never reaches 90°.

When reduction approaches infinity, the optimal cone angle can be found by setting the denominator of Eq. (19b) at zero:

$$\frac{m_1}{2} - \frac{m_2}{2}\cos\alpha + \cos\alpha \cdot E\left(\alpha, \frac{\sqrt{3}}{2}\right) - \sin\alpha\sqrt{1-\tfrac{3}{4}\sin^2\alpha} = 0 \quad (20a).$$

For small angles $$E\left(\alpha, \frac{\sqrt{3}}{2}\right)$$

is approximately equal to sin $\alpha$ and Eq. (20a) becomes $$m_1 - m_2\cos\alpha + 2\sin\alpha\left[\cos\alpha - \sqrt{1-\frac{3}{4}\sin^2\alpha}\right] = 0 \quad (20b).$$

Either one of Eqs. (20a), (20b) can be solved for $\alpha$ by successive approximations. The solution of Eq. (20b) is presented by FIG. 18 from which the asymptote for the respective lines in FIGS. 16 and 17 can be determined.

4. Conditions under Hydrodynamic Lubrication at Die

As is well established, hydrodynamic lubrication is considered to exist if two bodies are moved relative to each other under lubrication at a relative velocity high enough to ensure that lubricant will be dragged into the interface with certainty and a full separation between the two bodies will be obtained.

Hydrodynamic lubrication is a very effective means to lubricate the outer surface of the workpiece intensively and, in the procedure according to the invention, assists in keeping friction at the die lower than friction at the punch. For obtaining this type of operation, ram 32 (see FIG. 1a) is adapted to advance punch 30 with the workpiece thereon at a rate sufficient for hydrodynamic lubrication.

4.1 Upper Bound Solution

Additional letter symbols used in subsequent computations are as follows:

$\eta$ = viscosity of lubricant, $\epsilon$ = thickness of film of lubricant at die exit.

When friction at the punch is zero and hydrodynamic lubrication prevails between the die and the workpiece, then Eq. (3) is replaced by:

$$\left.\frac{\sigma_{xf}}{(2/\sqrt{3})\sigma_o}\right|_{m_2=0} = \frac{E(\alpha, \sqrt{3}/2)}{\sin\alpha}\cdot\ln\frac{t_o}{t_f} + \frac{1-\cos\alpha}{\sin\alpha} + \frac{\eta}{(2/\sqrt{3})\sigma_o}\cdot\frac{v_f}{t_f} < 4\left(\frac{t_f}{t_o}\right)^2\frac{\cos^3\alpha}{\sin\alpha} + \frac{L}{t_f} > + \frac{\sigma_{xb}}{(2/\sqrt{3})\sigma_o} + \frac{E\left(\alpha, \frac{\sqrt{3}}{2}\right)}{\sin\alpha}\cdot\frac{\epsilon}{t_f} + \frac{2\theta}{\frac{2}{\sqrt{3}}\sigma_o}\cdot\frac{v_f}{t_f} < \frac{\cos^3\alpha}{\sin\alpha}\left[1-\left(\frac{t_f}{t_o}\right)^2\right] + \frac{1}{2}\cdot\frac{L}{t_f} > \frac{1}{\frac{\epsilon}{t_f}} \quad (24).$$

The total drawing force when friction on the punch is zero becomes:

$$P_o = 2\pi R_f t_f \sigma_{xf} = \frac{2}{\sqrt{3}}\sigma_o \cdot 2\pi R_f t_f \left\{\frac{E\left(\alpha, \frac{\sqrt{3}}{2}\right)}{\sin\alpha}\cdot\ln\frac{t_o}{t_f} + \frac{1-\cos\alpha}{\sin\alpha} + \frac{\eta}{\frac{2}{\sqrt{3}}\sigma_o}\cdot\frac{v_f}{t_f} < 4\left(\frac{t_f}{t_o}\right)^2\cdot\frac{\cos^3\alpha}{\sin\alpha} + \frac{L}{t_f} > + \frac{\sigma_{xb}}{\frac{2}{\sqrt{3}}\sigma_o} + \frac{E\left(\alpha, \frac{\sqrt{3}}{2}\right)}{\sin\alpha}\cdot\frac{\epsilon}{t_f} + \frac{\eta}{\frac{2}{\sqrt{3}}\sigma_o}\cdot\frac{v_f}{t_f} < 2\frac{\cos^3\alpha}{\sin\alpha}\left[1-\left(\frac{t_f}{t_o}\right)\right]^2 + \frac{L}{t_f} > \cdot\frac{1}{\frac{\epsilon}{t_f}} \quad (25).\right\}$$

When friction losses over surface $\Gamma_5$, as given by Eq. (8), are divided by the final velocity and added to the power requirement on the punch, as given by Eq. (25), the punch force becomes:

$$P = P_o + \frac{\dot{W}_{S5}}{v_f} = \frac{2}{\sqrt{3}}\sigma_o \cdot 2\pi R_f t_f \left\{ \frac{E\left(\alpha, \frac{\sqrt{3}}{2}\right)}{\sin\alpha} \cdot \ln\frac{t_o}{t_f} + \frac{1-\cos\alpha}{\sin\alpha} + \frac{\eta}{\frac{2}{\sqrt{3}}\sigma_o} \cdot \frac{v_f}{t_f} < 4\left(\frac{t_f}{t_o}\right)^2 \cdot \frac{\cos^3\alpha}{\sin\alpha} + \frac{L}{t_f} > + \frac{m_2}{2\sin\alpha} \cdot \left[\left(\frac{t_o}{t_f}-1\right) - \ln\frac{t_o}{t_f}\right] + \frac{\sigma_{xb}}{\frac{2}{\sqrt{3}}\sigma_o} + \frac{E(\alpha, \frac{\sqrt{3}}{2})}{\sin\alpha} \cdot \frac{\epsilon}{t_f} + 2\frac{\eta}{\frac{2}{\sqrt{3}}\sigma_o} \cdot \frac{v_f}{t_f} < \frac{\cos^3\alpha}{\sin\alpha}\left[1 - \left(\frac{t_f}{t_o}\right)^2\right] + \frac{1}{2} \cdot \frac{L}{t_f} > \cdot \frac{1}{\epsilon/t_f} \right\} \quad (26).$$

If too small a gap $\epsilon$ is considered, then friction losses in Eq. (26) become excessive. If too large a gap $\epsilon$ is considered, then the reduction gets larger and the internal power of deformation is excessive. The punch force of Eq. (26) as a function of $\epsilon$ exhibits a minimum which can be found by differentiation as follows:

$$\frac{\partial P}{\partial(\epsilon/t_f)} = 0 = \frac{E\left(\alpha, \frac{\sqrt{3}}{2}\right)}{\sin\alpha} - 2 \cdot \frac{\eta}{(2/\sqrt{3})\sigma_o} \cdot \frac{v_f}{t_f} < \frac{\cos^2\alpha}{\sin\alpha}\left[1 - \left(\frac{t_f}{t_o}\right)^2\right] + \frac{1}{2} \cdot \frac{L}{t_f} > \cdot \frac{1}{(\epsilon/t_f)^2} \quad (27).$$

The expected relative thickness of the film of lubricant is $$\frac{\epsilon}{t_f} = \sqrt{\frac{\sin\alpha}{E\left(\alpha, \frac{\sqrt{3}}{2}\right)} \cdot \frac{\eta}{\frac{2}{\sqrt{3}}\sigma_o} \cdot \frac{v_f}{t_f} < 2\frac{\cos^3\alpha}{\sin\alpha}\left[1 - \left(\frac{t_f}{t_o}\right)\right]^2 + \frac{L}{t_f} >} \quad (28).$$

4.2 Expected Thickness of the Film of Lubricant as Condition for the Existence of Hydrodynamic Lubrication If the expected thickness of the film of lubricant as indicated by Eq. (28) is less than the actual roughness and irregularities of the surfaces in contact, then metal to metal contact is unavoidable and hydrodynamic lubrication does not prevail. When the expected relative thickness $\epsilon/t_f$ reaches a certain critical value $(\epsilon/t_f)_{cr}$, which is determined from surface roughness, then hydrodynamic lubrication commences. The critical ratio $(\epsilon/t_f)_{cr}$ has to be determined by experience. Eq. (28) can be rearranged to read: Hydrodynamic lubrication is expected if $$\frac{\eta}{\frac{2}{\sqrt{3}}\sigma_o} \cdot \frac{v_f}{t_f} \geqslant \frac{\frac{E(\alpha, \sqrt{3}/2)}{\sin\alpha}}{2\frac{\cos^3\alpha}{\sin\alpha}\left[1 - \left(\frac{t_f}{t_o}\right)^2\right] + \frac{L}{t_f}} \cdot \left(\frac{\epsilon}{t_f}\right)^2_{cr} \quad (29).$$

The term $$\frac{\eta v_f}{\left(\frac{2}{\sqrt{3}}\sigma_o t_f\right)}$$

is sometimes referred to as the Sommerfeld number. The critical ratio $(\epsilon/t_f)_{cr}$ is much smaller than one. The term $$\frac{E\left(\alpha, \frac{\sqrt{3}}{2}\right)}{\sin\alpha}$$

is about one, and the denominator is close to a magnitude of one. Thus, the Sommerfeld number is a small number.

From Eq. (29) the following observations can be made:

The smaller the cone angle $\alpha$, the final thickness $t_f$, the yield or flow stress $\sigma_o$, and the critical ratio, that is, the roughness of the die, $(\epsilon/t_f)_{cr}$; and the higher the viscosity $\eta$, the punch velocity $v_f$, the reduction $(t_o/t_f)$, and the length of the land L, the easier it is to maintain hydrodynamic lubrication.

4.3 Punch Force and Wall Tension

When $\epsilon/t_f$ from Eq. (28) is substituted into Eq. (26), the punch force becomes $$P = \frac{2}{\sqrt{3}}\sigma_o \cdot 2\pi R_f t_f \left\{ \frac{E\ \alpha, \left(\frac{\sqrt{3}}{2}\right)}{\sin\alpha} \cdot \ln \frac{t_o}{t_f} + \frac{1-\cos\alpha}{\sin\alpha} + \frac{\eta}{\frac{2}{\sqrt{3}}\sigma_o} \cdot \frac{v_f}{t_f} < 4\left(\frac{t_f}{t_o}\right)^2 \cdot \frac{\cos^3\alpha}{\sin\alpha} + \frac{L}{t_f} > + \frac{m_2}{2\sin\alpha}\left[\left(\frac{t_o}{t_f} - 1\right) - \ln\frac{t_o}{t_f}\right] + \frac{\sigma_{xb}}{\frac{2}{\sqrt{3}}\sigma_o} + \sqrt{\frac{E\ \alpha, \left(\frac{\sqrt{3}}{2}\right)}{\sin\alpha} \cdot \frac{\eta}{\frac{2}{\sqrt{3}}\sigma_o} \cdot \frac{v_f}{t_f} < 2\ \frac{\cos^3\alpha}{\sin\alpha} - \left[1 - \left(\frac{t_f}{t_o}\right)^2\right] + \frac{L}{t_f} >} \right\} \quad (30).$$

The tension on the wall of the cup is found when $P_f$, the friction force on the punch, as determined by Eq. (10), is subtracted from Eq. (30) and the result divided by $(2/\sqrt{3})\ \sigma_o \cdot 2\pi R_f t_f$.

Wall tension becomes:

$$\frac{\sigma_{xf}}{\frac{2}{\sqrt{3}}\sigma_o} = \frac{E\ \alpha, \left(\frac{\sqrt{3}}{2}\right)}{\sin\alpha} \ln \frac{t_o}{t_f} + \frac{1-\cos\alpha}{\sin\alpha} - \frac{m_2}{2\sin\alpha} \cdot \ln\frac{t_o}{t_f} + \frac{\sigma_{xb}}{\frac{2}{\sqrt{3}}\sigma_o} + \frac{\eta}{\frac{2}{\sqrt{3}}\sigma_o} \cdot \frac{v_f}{t_f} < 4\left(\frac{t_f}{t_o}\right)^2 \cdot \frac{\cos^3\alpha}{\sin\alpha} + \frac{L}{t_f} > + 2\sqrt{\frac{E(\alpha, \sqrt{3}/2)}{\sin\alpha} \cdot \frac{\eta}{(2/\sqrt{3})\sigma_o} \cdot \frac{v_f}{t_f} < 2\ \frac{\cos^3\alpha}{\sin\alpha}\left[1 - \left(\frac{t_f}{t_o}\right)^2\right] + \frac{L}{t_f} >} \quad (31).$$

The effects of back tension $$\left(\frac{\sigma_{xb}}{\frac{2}{\sqrt{3}}\sigma_o}\right),$$

of wall thickness ratio $t_o/t_f$, and of the semi-cone angle $\alpha$ of the die on relative wall tension $$\left(\frac{\sigma_{xf}}{\frac{2}{\sqrt{3}}\sigma_o}\right),$$

as expressed by Eq. (31), are qualitatively the same as those expressed by Eq. (3) when friction at the punch is larger than friction at the die (no optimal angle). Such values are plotted in FIGS. 6b and 7b. For hydrodynamic lubrication to prevail, the ironing speed $v_f$, must exceed a critical speed defined by Eq. (29).

One specific characteristic for ironing with hydrodynamic lubrication is the fact that the friction at the punch is much larger than friction at the die and $m_1$ can be ignored, so that Eq. (31) for practical purposes reads:

$$\frac{\sigma_{xf}}{\frac{2}{\sqrt{3}}\sigma_o} = \ln\frac{t_o}{t_f} + \frac{1-\cos\alpha}{\sin\alpha} - \frac{m_2}{2\sin\alpha} \cdot \ln\frac{t_o}{t_f} + \frac{\sigma_{xb}}{\frac{2}{\sqrt{3}}\sigma_o} \quad (32).$$

For small cone angles, punch friction $m_2$ can easily be made larger than $2\sin\alpha$, and thus no tension is applied on the walls of the cup. No limit on the amount of reduction possible is set and the cone angle should be made as small as design restrictions permit.

While certain specific examples have been described and illustrated, it will be understood that various modifications and changes may be made without departing from the scope of the invention as defined in the appended claims.

What is claimed is:

1. In a method of shaping a hollow workpiece with the aid of a punch and a die having an aperture extending therethrough, said aperture including a conical portion having a semi-cone angle $\alpha$; the steps of providing said workpiece with a side wall having an inner and an outer surface; causing said punch to engage said inner surface of the side wall of the hollow workpiece so that the latter is positioned on said punch; moving said punch with said workpiece thereon relative to said die and into said conical portion of the aperture thereof to iron said side wall and thereby reduce the thickness and increase the length thereof to a predetermined degree while subjecting said workpiece to differential frictional forces including a predetermined, relatively large frictional force resulting from contact of said inner surface of the side wall with said punch, and a smaller frictional force acting on said outer surface of the side wall and resulting from movement of said side wall relative to said die, said differential frictional forces being effective to limit tensile stresses in the ironed portion of said side wall during ironing; and controlling said differential frictional forces in part by said semi-cone angle $\alpha$ being [in agreement with the equation $$\left[\sin\alpha\sqrt{1 - \frac{3}{4}\sin^2\alpha} - \cos\alpha \cdot E\left(\alpha, \frac{\sqrt{3}}{2}\right) - \frac{m_1}{2} + \frac{m_2}{2}\cos\alpha\right] \ln\frac{t_o}{t_f} + 1 - \cos\alpha = 0,]$$

*limited by the value determined by the equation*

$$E(\alpha, \sqrt{3/2}) + \frac{m_1}{2}\cos\alpha - \frac{m_2}{2} = 0,$$

wherein $$E\left(\alpha, \frac{\sqrt{3}}{2}\right) = \text{elliptic integral of second order,}$$

$m_1$ = constant friction factor at conical portion of the die aperture, $m_2$ = constant friction factor at punch [, $t_o$ = original wall thickness of side wall of workpiece, $t_f$ = final wall thickness of side wall of workpiece after ironing ].

2. A method as defined in claim 1, wherein said die has a single ironing portion, and said workpiece is ironed to a predetermined final degree during passage through said single ironing portion.

3. A method as defined in claim 1, including the step of providing said punch with a surface rougher than the inner surface of said tapered aperture of the die, the relatively rough surface of said punch being caused to engage said interior surface of the side wall of the workpiece.

4. A method as defined in claim 1, in which said aperture of the die includes a substantially cylindrical portion, and the magnitude of said relatively large frictional force is in accordance with the expression $$m_2 > 2E\left(\alpha, \frac{\sqrt{3}}{2}\right) + 2\,\frac{1-\cos\alpha}{\ln\frac{t_o}{t_f}} + m_1\left(\cos\alpha + \frac{L}{t_f}\cdot\frac{\sin\alpha}{\ln\frac{t_o}{t_f}}\right) + 2\,\frac{\frac{\sigma_{xb}-\sigma_{xf}}{2}}{\sqrt{3}\,\sigma_o}\cdot\frac{\sin\alpha}{\ln\frac{t_o}{t_f}},$$

wherein

L = length of substantially cylindrical portion of die, $\sigma_{xb}$ = back pull stress in side wall of workpiece, $\sigma_{xf}$ = front pull stress in ironed portion of side wall, $\sigma_o$ = yield stress of workpiece material,

*$t_o$ = original wall thickness of side wall of workpiece,*

*$t_f$ = final wall thickness of side wall of workpiece after ironing.*

5. A method as defined in claim 4, wherein the ironed portion of said side wall is kept substantially free of tensile stresses during the ironing step and, accordingly, said expression is reduced to $$m_2 > 2E\left(\alpha, \frac{\sqrt{3}}{2}\right) + 2\,\frac{1-\cos\alpha}{\ln\frac{t_o}{t_f}} + m_1\left(\cos\alpha + \frac{L}{t_f}\cdot\frac{\sin\alpha}{\ln\frac{t_o}{t_f}}\right).$$

6. A method as defined in claim 5, wherein said semicone angle $\alpha$ of the conical portion of the die aperture is smaller than approximately 55° and thus the reduced expression is approximately equal to $$m_2 > 2\sin\alpha + 2\,\frac{1-\cos\alpha}{\ln\frac{t_o}{t_f}} + m_1\left(\cos\alpha + \frac{L}{t_f}\cdot\frac{\sin\alpha}{\ln\frac{t_o}{t_f}}\right).$$

7. A method as defined in claim 4, wherein the portion of said side wall emerging from said conical portion of the die aperture is subjected to tensile stresses in accordance with the equation $$\frac{\sigma_{xf}}{(2/\sqrt{3})\sigma_o} = \frac{E(\alpha, \sqrt{3}/2)}{\sin\alpha}\cdot\ln\frac{t_o}{t_f} + \frac{1-\cos\alpha}{\sin\alpha} + \frac{m_1}{2}\left(\cot\alpha\cdot\ln\frac{t_o}{t_f} + \frac{L}{t_f}\right) - \frac{m_2}{2\sin\alpha}\cdot\ln\frac{t_o}{t_f} + \frac{\sigma_{xb}}{(2/\sqrt{3})\sigma_o}.$$

8. A method as defined in claim 4, in which the thickness of said side wall is reduced in accordance with the equation $$\frac{t_o}{t_f} = \exp\left\{\frac{\frac{\sigma_{xf}-\sigma_{xb}}{(2/\sqrt{3})\sigma_o} - \frac{1-\cos\alpha}{\sin\alpha} - \frac{m_1}{2}\cdot\frac{L}{t_f}}{\frac{E(\alpha, \sqrt{3}/2)}{\sin\alpha} + \frac{m_1}{2}\cot\alpha - \frac{m_2}{2\sin\alpha}}\right\},$$

wherein exp = exponential function of; and remaining symbols are as set forth in claim 7.

9. A method as defined in claim 8, in which the ironed portion of said side wall is kept substantially free of tensile stresses during the ironing step and, accordingly, the last-cited equation is reduced and modified to $$\frac{t_o}{t_f} \geqslant \exp\frac{2(1-\cos\alpha) + m_1\cdot(L/t_f)\sin\alpha}{m_2 - 2E(\alpha, \sqrt{3}/2 - m_1\cos\alpha},$$

wherein $\alpha \leqslant \alpha_{cr}$ ($\alpha_{or}$ = critical value of $\alpha$).

10. In a method of shaping a hollow workpiece with the aid of a punch and a die having an aperture extending therethrough, said aperture including a conical portion and a substantially cylindrical portion; the steps of providing said workpiece with a side wall having an inner and an outer surface; causing said punch to engage said inner surface of the side wall of the hollow workpiece so that the latter is positioned on said punch; moving said punch with said workpiece thereon relative to said die and into said conical portion of the aperture thereof to iron said side wall and thereby reduce the thickness and increase the length thereof to a predetermined degree while subjecting said workpiece to differential frictional forces including a predetermined, relatively large frictional force resulting from contact of said inner surface of the side wall with said punch, and a smaller frictional force acting on said outer surface of the side wall and resulting from movement of said side wall relative to said die, said differential frictional forces being effective to limit tensile stresses in the ironed portion of said side wall during ironing; and controlling said smaller frictional force by providing hydrodynamic lubrication in the area in which said outer surface of the side wall of the workpiece passes through said aperture of the die, said hydrodynamic lubrication being obtained under conditions represented by the equation $$\frac{\eta}{\frac{2}{\sqrt{3}}\sigma_o}\cdot\frac{v_f}{t_f} \geq \frac{E\left(\alpha, \frac{\sqrt{3}}{2}\right)/\sin\alpha}{2\frac{\cos^3\alpha}{\sin\alpha}\left[1-\left(\frac{t_f}{t_o}\right)^2\right]+\frac{L}{t_f}}\cdot\left(\frac{\epsilon}{t_f}\right)^2 cr,$$

wherein $\eta$ = viscosity of lubricant, $\sigma_o$ = yield or flow stress of workpiece material, $v_f$ = final velocity of workpiece material, $t_o$ = original thickness of side wall of workpiece, $t_f$ = final thickness of side wall of workpiece after ironing, $\alpha$ = semi-cone angle of conical portion of aperture of die, $E(\alpha, \sqrt{3}/2)$ = elliptic integral of second order, L = length of substantially cylindrical portion of die, $\epsilon$ = thickness of lubricant film at die exit, $(\epsilon/t_f)_{cr}$ = critical value of relative thickness of lubricant film at die exit.

11. A method as defined in claim 10, in which with friction at the die being negligible the portion of said side wall emerging from said conical portion of the die aperture is subjected to tensile stresses in accordance with the equation $$\frac{\sigma_{xf}}{(2/\sqrt{3})\sigma_o} = \ln\frac{t_o}{t_f} + \frac{1-\cos\alpha}{\sin\alpha} - \frac{m_2}{2\sin\alpha}\cdot\ln\frac{t_o}{t_f} + \frac{\sigma_{xb}}{(2/\sqrt{3})\sigma_o},$$

wherein $\sigma_{xf}$ = front pull stress in ironed portion of side wall, $\sigma_{xb}$ = back pull stress in side wall, $m_2$ = friction factor at punch; and remaining symbols are as set forth in claim 10.

12. In a method of shaping a cup-like workpiece from a substantially flat blank with the aid of a punch and die means having an aperture extending therethrough, said aperture including a conical portion having a semi-cone angle $\alpha$; the steps of causing said blank to abut said die means; advancing said punch relative to said die means so as to draw said blank into said aperture and impart thereto the form of a cup having a side wall and a bottom integral therewith, said side wall having an outer and an inner surface; continuing the movement of said punch relative to said die means to introduce said workpiece into said conical portion of the aperture of the die means and iron said side wall and thereby reduce the thickness and increase the length thereof to a predetermined degree while subjecting said workpiece to differential frictional forces including a predetermined, relatively large frictional force resulting from contact of said inner surface of the side wall with said punch, and a smaller frictional force acting on said outer surface of the side wall and resulting from movement of said side wall relative to said die means, said differential frictional forces being effective to minimize application of forces to said bottom of the cup-shaped workpiece and thereby limit tensile stresses in the ironed portion of said side wall during ironing; and controlling said differential frictional forces in part by said semi-cone angle $\alpha$ being [in agreement with the equation $$\left[\sin\alpha\sqrt{1-\frac{3}{4}\sin^2\alpha}-\cos\alpha\cdot E\left(\alpha, \frac{\sqrt{3}}{2}\right) - \frac{m_1}{2}+\frac{m_2}{2}\cos\alpha\right]\ln\frac{t_o}{t_f}+1-\cos\alpha=0,]$$

*limited by the value determined by the equation*

$$E(\alpha, \sqrt{3/2})+\frac{m_1}{2}\cos\alpha-\frac{m_2}{2}=0,$$

wherein $E\left(\alpha, \frac{\sqrt{3}}{2}\right)$ = elliptic integral of second order, $m_1$ = constant friction factor at conical portion of the die aperture, $m_2$ = constant friction factor at punch [, $t_o$ = original wall thickness of side wall of workpiece, $t_f$ = final wall thickness of side wall of workpiece after ironing].

13. A method as defined in claim 12, including the steps of starting said ironing substantially immediately after formation of said bottom while keeping the ironed portion of said workpiece generally free of tensile stresses during ironing.

14. In apparatus for shaping a hollow workpiece provided with a side wall having an inner and an outer surface; die means having an aperture extending therethrough, said aperture including a conical ironing portion; a punch movable relative to said die means and arranged to engage said inner surface of the side wall of the workpiece for advancing the latter into said ironing portion of the die aperture so as to iron said workpiece; first means for subjecting said workpiece to a predetermined, relatively large frictional force resulting from contact of said inner surface of the side wall with said punch; and second means for subjecting said workpiece to a smaller frictional force acting on said outer surface of the side wall and resulting from movement of said side wall relative to said die means; said first and second means being effective to limit tensile stresses in said side wall during ironing; and said conical portion of the aperture of the die means having a semi-cone angle $\alpha$ [in accordance with the equation $$\left[\sin\alpha\sqrt{1-\frac{3}{4}\sin^2\alpha}-\cos\alpha\cdot E\left(\alpha, \frac{\sqrt{3}}{2}\right) - \frac{m_1}{2}+\frac{m_2}{2}\cos\alpha\right]\ln\frac{t_o}{t_f}+1-\cos\alpha=0,$$

wherein $\alpha$ = semi-cone angle of ironing portion of die means,]

*limited by the value determined by the equation*

$$E(\alpha, \sqrt{3/2})+\frac{m_1}{2}\cos\alpha-\frac{m_2}{2}=0,$$

*wherein*

$E\left(\alpha, \frac{\sqrt{3}}{2}\right)$ = elliptic integral of second order, $m_1$ = constant friction factor at conical portion of the die aperture, $m_2$ = constant friction factor at punch [, $t_o$ = original wall thickness of side wall of workpiece, $t_f$ = final wall thickness of side wall of workpiece after ironing ].

15. Apparatus as defined in claim 14, wherein said first means includes a punch surface rougher than the surface of said aperture of the die means, said rougher surface of the punch being arranged to engage said inner surface of the side wall of the workpiece.

16. Apparatus as defined in claim 15, wherein said second means includes an actuating device for moving said punch and workpiece relative to said die means at a rate sufficient for hydrodynamic lubrication of the area in which said outer surface of the side wall of the workpiece passes through said ironing portion of the die aperture.

17. Apparatus as defined in claim 14, wherein said aperture of the die means includes a drawing portion preceding said ironing portion and cooperating with said punch for drawing said workpiece from a substantially flat blank to the shape of a cup and for thereby producing said side wall and a bottom integral therewith prior to and in series with the ironing operation; and wherein said drawing and ironing portions of the aperture of the die means are arranged so close to each other that ironing will commence as soon as said bottom of the workpiece emerges from said drawing portion of the aperture of the die means.

18. Apparatus as defined in claim 17, wherein said drawing portion merges into said ironing portion.

* * * * *